(12) United States Patent
Nakamura

(10) Patent No.: US 10,313,615 B2
(45) Date of Patent: Jun. 4, 2019

(54) IMAGE PROCESSING METHOD

(71) Applicant: Hitachi Kokusai Electric, Inc., Tokyo (JP)

(72) Inventor: Kazuhiko Nakamura, Kodaira (JP)

(73) Assignee: HITACHI KOKUSAI ELECTRIC, INC., Tokyo (JP)

( * ) Notice: Subject to any disclaimer, the term of this patent is extended or adjusted under 35 U.S.C. 154(b) by 142 days.

(21) Appl. No.: 15/444,516

(22) Filed: Feb. 28, 2017

(65) Prior Publication Data
US 2017/0171480 A1 Jun. 15, 2017

Related U.S. Application Data

(63) Continuation-in-part of application No. PCT/JP2015/073705, filed on Aug. 24, 2015.

(30) Foreign Application Priority Data

Aug. 29, 2014 (JP) ................................. 2014-175710

(51) Int. Cl.
*H04N 5/208* (2006.01)
*H04N 5/357* (2011.01)
(Continued)

(52) U.S. Cl.
CPC .......... *H04N 5/3572* (2013.01); *G02B 13/18* (2013.01); *G06K 9/4604* (2013.01); *G06K 9/482* (2013.01);
(Continued)

(58) Field of Classification Search
None
See application file for complete search history.

(56) References Cited

U.S. PATENT DOCUMENTS

| 7,944,487 B2 * | 5/2011 | Takane | .................. H04N 5/217 348/241 |
| 8,639,053 B2 * | 1/2014 | Elton | ................... G06T 3/4053 382/264 |

(Continued)

FOREIGN PATENT DOCUMENTS

| JP | 2009-303206 A | 12/2009 |
| JP | 2014-53700 A | 3/2014 |
| WO | WO2014/112622 A | 7/2014 |

OTHER PUBLICATIONS

International Search Report from International Application No. PCT/JP2015/073705 dated Nov. 17, 2015.

*Primary Examiner* — Ricky Chin
(74) *Attorney, Agent, or Firm* — Brundidge & Stanger, P.C.

(57) ABSTRACT

There is disclosed an image processing method in which a video signal is inputted from an imaging optical system in which astigmatism remains, and is displayed on a two-dimensional display apparatus. Based on the circumferential direction modulation factor and radial direction modulation factor of a lens used in the imaging optical system, a signal including the amount of vertical or horizontal modulation factor correction proportional to an nth power (n is an integer greater than 1) of a distance from a center position of a screen of the two-dimensional display apparatus is outputted for at least one vertical or horizontal frequency of the two-dimensional display apparatus.

1 Claim, 18 Drawing Sheets

(51) Int. Cl.
  *H04N 5/14* (2006.01)
  *G06K 9/48* (2006.01)
  *G06K 9/46* (2006.01)
  *H04N 9/64* (2006.01)
  *G02B 13/18* (2006.01)
  *H04N 5/232* (2006.01)

(52) U.S. Cl.
  CPC ............ *H04N 5/142* (2013.01); *H04N 5/208* (2013.01); *H04N 5/23209* (2013.01); *H04N 5/23238* (2013.01); *H04N 9/646* (2013.01)

(56) References Cited

U.S. PATENT DOCUMENTS

| | | | |
|---|---|---|---|
| 2002/0067414 A1* | 6/2002 | Tanji | H04N 5/202 348/254 |
| 2004/0207758 A1* | 10/2004 | Sai | H04N 1/4092 348/627 |
| 2006/0132649 A1* | 6/2006 | Miyazawa | H04N 5/142 348/458 |
| 2006/0282867 A1* | 12/2006 | Mizuhashi | H04N 17/04 725/105 |
| 2007/0070248 A1* | 3/2007 | Zhou | G06T 3/4084 348/581 |
| 2011/0058249 A1* | 3/2011 | Erlandson | H01S 3/0805 359/333 |
| 2013/0022288 A1* | 1/2013 | Sartor | G06T 5/002 382/266 |
| 2013/0136367 A1* | 5/2013 | Kitajima | G06K 9/4604 382/199 |
| 2014/0009748 A1* | 1/2014 | Leonessa | G01C 3/08 356/4.03 |
| 2016/0274344 A1* | 9/2016 | Lin | G02B 17/0856 |
| 2017/0041557 A1* | 2/2017 | Urich | H04N 5/272 |
| 2017/0192229 A1* | 7/2017 | Nakamura | G02B 17/02 |
| 2017/0288708 A1* | 10/2017 | Ota | H04B 1/0475 |

* cited by examiner

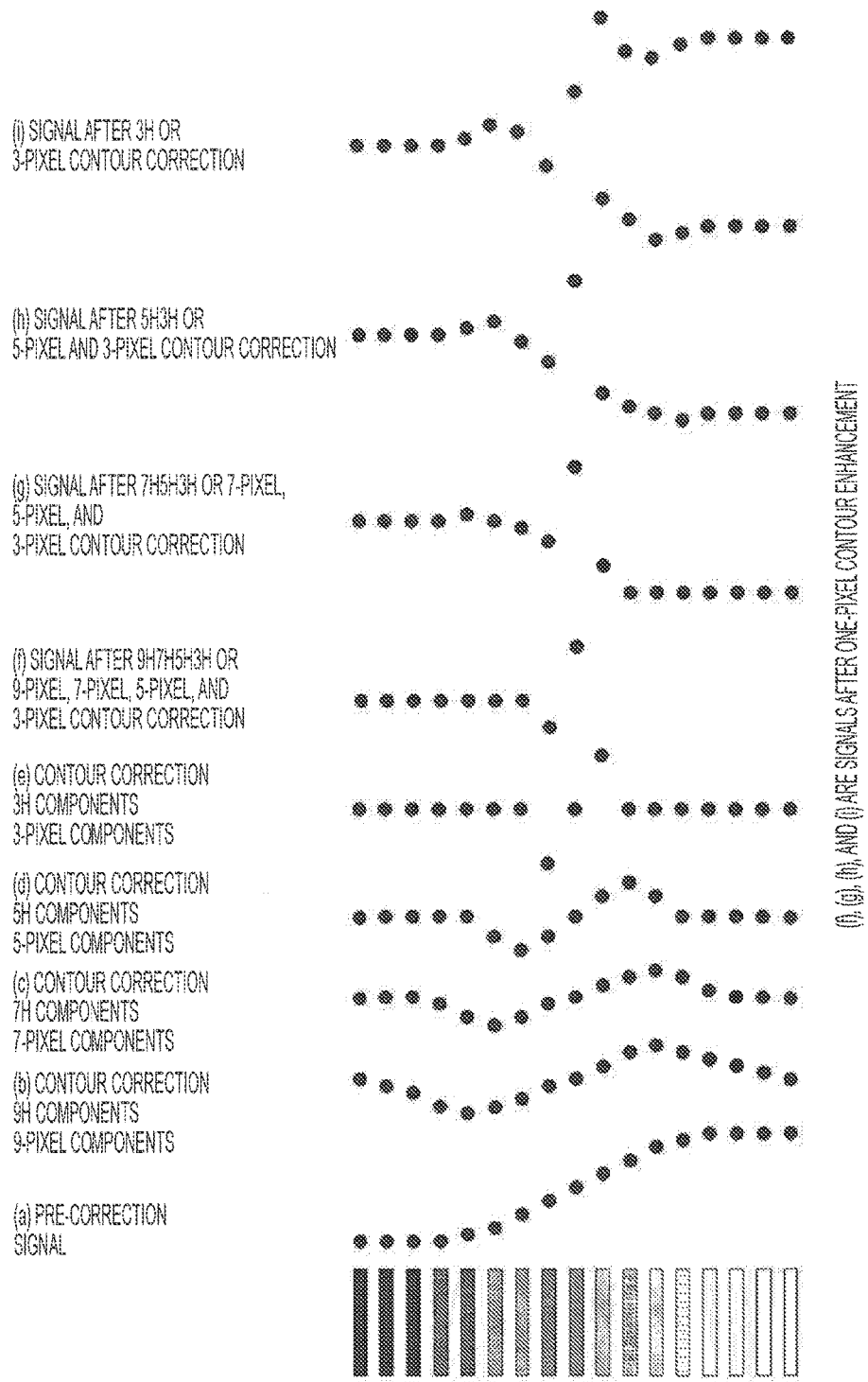

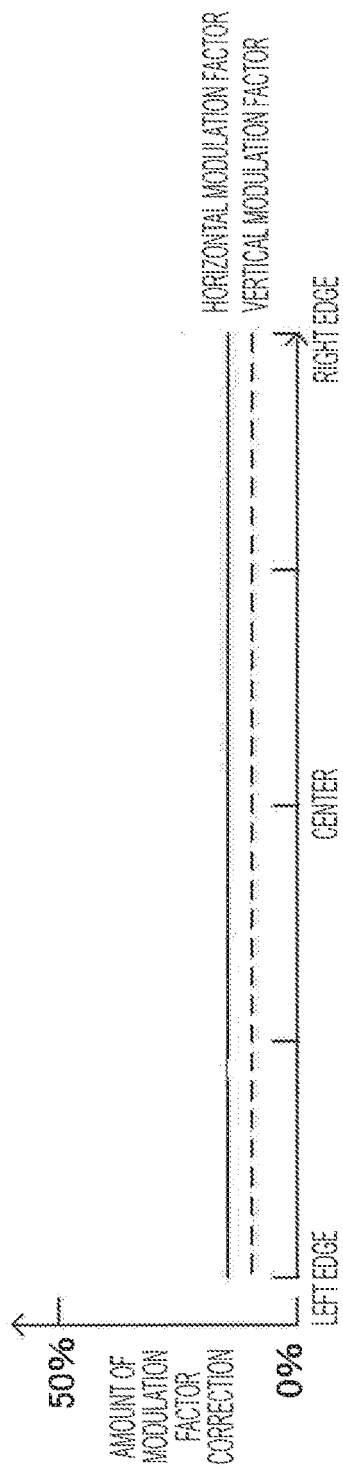
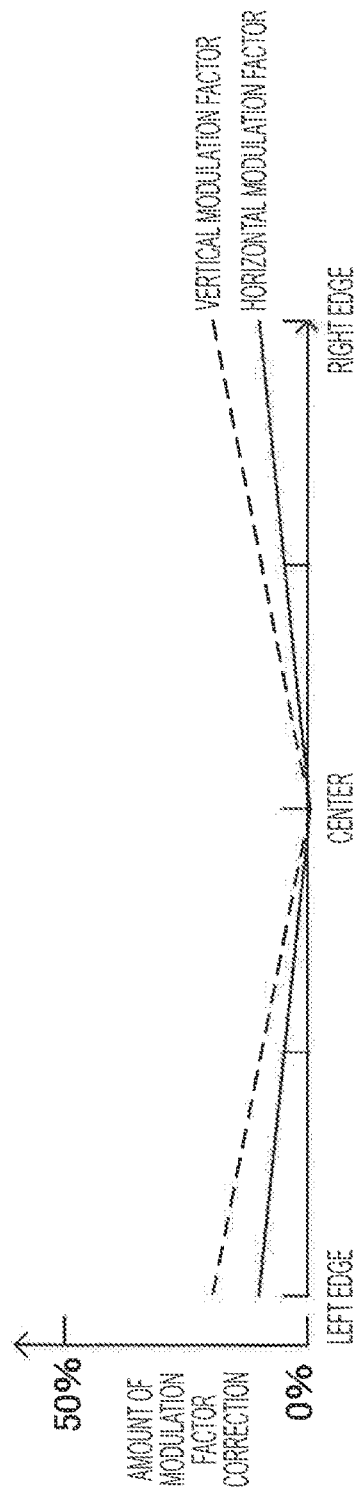
FIG. 8A
FIG. 8B

IMAGE PROCESSING METHOD

CROSS-REFERENCE TO RELATED APPLICATION

The present application is a continuation-in-part application under 35 U.S.C § 111(a) of International Application No. PCT/JP2015/073705, filed Aug. 24, 2015, which claims priority to Japanese Patent Application No. 2014-175710, filed Aug. 29, 2014. The contents of these applications are incorporated herein by reference in their entirety.

BACKGROUND OF THE INVENTION

1. Field of the Invention

The present invention relates to an image processing method for an imaging apparatus that uses a solid-state imaging device.

2. Description of the Related Art

An analog front end (AFE) is widely used. The AFE includes correlated double sampling (CDS) that removes noise from a signal outputted from a charge coupled device (CCD) imaging device; dark current correction; automatic gain control (AGC); and an analog digital converter (ADC) that converts the signal to a digital video signal Vi. The ADC grayscale of the AFE is conventionally 10 bits, but 12 bits and 14 bits have become common. Furthermore, there has been advanced improvement in a complementary metal oxide semiconductor (CMOS) imaging device that allows high-speed reading by integrating a drive circuit and a read circuit.

Furthermore, with the advancement of integration of a digital signal processing circuit, not only a memory-integrated digital signal processor (DSP) dedicated for video, but also an inexpensive, generic field programmable gate array (FPGA) can easily implement the storing of output signals from a plurality of lines and the performing of arithmetic processing. Megapixel cameras with over one million pixels, high definition television (HDTV) cameras, high-speed imaging HDTV cameras, HDTV cameras with a recording unit, HDTV cameras with an Internet Protocol (hereinafter, IP) transmitting unit, ultra-high definition televisions (UHDTVs) for higher definition 2K×4K cameras or 4K×8K cameras, and uncompressed recording apparatuses using a hard disk drive (HDD) have also been put into commercial production. In two-dimensional video display apparatuses, too, there has been advancement in higher definition 2K×4K or 4K×8K UHDTV display, high-speed display, and ultra-slimming down.

Since the refractive index of a lens varies depending on the wavelength of light, the focal length also varies depending on the wavelength of light. Since the focal length of a lens varies depending on the wavelength, there occur axial chromatic aberration where the position of an image plane is shifted back and forth depending on the color, and magnification chromatic aberration where the magnification of an image varies depending on the color and thus the size of an image varies depending on the color.

In addition, due to spherical aberration where the position in an optical axis direction of the focal point varies depending on the distance of an incident point from an optical axis, the modulation factor of the entire screen is reduced. Due to coma aberration where light emerging from one point outside the optical axis does not converge to a single point on the image plane, the modulation factor of an area on the periphery of the image is reduced. Furthermore, due to astigmatism where an image point in a concentric direction and an image point in a radial direction by a ray of light emerging from one point outside the optical axis are shifted from each other, the modulation factor of an area on the periphery of the image is reduced.

The spherical aberration is proportional to the third power of the numerical aperture (NA), and is irrelevant to the size of the field of view, and is the one and only aberration that appears even at the center of the screen. The spherical aberration of a lens doublet composed of two lenses in which the refractive index of a concave lens is higher than that of a convex lens is reduced by one digit or more over a single lens. In addition, the coma aberration is proportional to the second power of the open area ratio NA which is the reciprocal of the aperture ratio F, and to the first order of the size of the field of view. In addition, the astigmatism is proportional to the first order of NA and to the second order of the size of the field of view, and the modulation factor is reduced by the astigmatism particularly in an area on the periphery of the image.

A phenomenon where light collected by a lens does not focus on a single point is called aberration, and a lens that is corrected for spherical aberration and coma aberration among aberrations is called an aplanat, and furthermore, a lens in which a focal position shift caused by the wavelengths of light differing from each other is corrected at two locations, i.e., the red C-line (656.3 nm) and the blue F-line (486.1 nm), is called an achromat which is an achromatic lens. A lens that satisfies conditions that, for example, chromatic aberration is corrected at three wavelengths where the violet g-line (435.8 nm) is further added, and spherical aberration and coma aberration are corrected at two wavelengths is named as an apochromat by Abbe. A lens that is also corrected for astigmatism and that maintains both a circumferential direction modulation factor and a radial direction modulation factor is large in size and too expensive.

A lens that is not even an aplanat due to its insufficient correction of spherical aberration and that has a reduced modulation factor even at the center of the screen is insufficient in performance for UHDTVs. A lens in which coma aberration is insufficiently corrected and both of a circumferential direction modulation factor and a radial direction modulation factor are reduced is insufficient in performance for UHDTVs unless the circumferential direction modulation factor and the radial direction modulation factor are individually made changeable.

Meanwhile, an example of a DX standard macro which is a unifocal lens is the same as the wide angle of a zoom lens. In addition, an example of a DX standard macro which is a unifocal lens is the opposite of the telephoto of a zoom lens. In addition, an example of an FX medium telephoto which is a unifocal lens is the opposite of the wide angle of a zoom lens. Remaining aberration varies depending on different aberration correction methods.

Meanwhile, the applicant discloses a technique in which an imaging apparatus including a lens, an imaging device, and a video signal processing circuit having a contour correction function includes eight or more line memories, and generates a vertical contour correction signal from each of a plurality of video signals which are delayed by an integer horizontal period. In addition, the applicant discloses a technique in which the imaging apparatus has eight or more pixel delay functions, and generates a horizontal contour correction signal from each of a plurality of video signals which are delayed by an integer pixel quantity. Upon checking, the vertical contour correction signals and the horizontal contour correction signals are added to the video signals (see Patent Literature 1).

FIG. 5 is a block diagram showing an overall configuration of a conventional imaging apparatus. In FIG. 5, 1: a lens, 2: an imaging unit, 7: an imaging apparatus, 8: a signal processing unit, and 9: a CPU including a location-on-the-screen control unit. The signal processing unit 8 performs a contour enhancement process as shown in Patent Literature 1.

In addition, there is also an imaging apparatus that performs an image sharpening process such as an aperture correction process or an edge enhancement process only for a concentric direction of an image having been subjected to distortion aberration correction by image processing, and does not perform the image sharpening process for a radial direction of the image (see Patent Literature 2).

CITATION LIST

Patent Literature

Patent Literature 1: WO 2014/112622 A
Patent Literature 2: JP 2014-53700 A

Solution to Problem

An object of the present invention is to provide an image processing method for correcting a modulation factor of a lens in which a circumferential direction modulation factor and a radial direction modulation factor significantly differ from each other. For example, in generic, low-priced lenses, even in an apochromat which is a lens in which spherical aberration irrelevant to the size of the field of view, coma aberration proportional to the first power of the size of the field of view, and chromatic aberration are sufficiently corrected, correction of astigmatism proportional to the second power of the size of the field of view is insufficient. An object of the present invention is to provide an image processing method in which, when a lens in which a circumferential direction modulation factor and a radial direction modulation factor differ from each other is used in a high-resolution 4K or 8K camera, a modulation factor of the lens is corrected.

SUMMARY OF THE INVENTION

An image processing method for a wide-aspect ratio imaging apparatus that uses a lens includes the following steps:
performing horizontal contour correction and vertical contour correction for multi-frequency enhancement or horizontal aperture (modulation factor) correction and vertical aperture (modulation factor) correction for multi-frequency enhancement;
obtaining type information, focal length information, and aperture ratio information of the lens;
obtaining and storing circumferential direction modulation factor information and radial direction modulation factor information of the lens; and
individually calculating, for each frequency, an amount of vertical contour (modulation factor) correction and an amount of horizontal contour (modulation factor) correction which are proportional to a distance of a pixel from a center of a screen, an amount of vertical contour (modulation factor) correction and an amount of horizontal contour (modulation factor) correction which are proportional to a second power of the distance of the pixel from the center of the screen, an amount of vertical contour (modulation factor) correction and an amount of horizontal contour (modulation factor) correction which are proportional to a fourth power of the distance of the pixel from the center of the screen, an amount of vertical contour (modulation factor) correction and an amount of horizontal contour (modulation factor) correction which are proportional to a sixth power of the distance of the pixel from the center of the screen, and an amount of vertical contour (modulation factor) correction and an amount of horizontal contour (modulation factor) correction which are proportional to an eighth power of the distance of the pixel from the center of the screen, for a location on the screen to be displayed, based on the type information, focal length information, and aperture ratio information of the lens, the circumferential direction modulation factor information, and the radial direction modulation factor information, and individually performing vertical contour (modulation factor) correction and horizontal contour (modulation factor) correction.

BRIEF DESCRIPTION OF DRAWINGS

FIG. 2B is a schematic diagram (for measurement) showing the generation of multi-scanning line (H) vertical contour correction signals or multi-pixel horizontal contour correction signals of one embodiment of the present invention.

FIG. 8A is a schematic diagram showing an example of the amount of horizontal modulation factor correction and the amount of vertical modulation factor correction for a location on a screen, in which the zero-order indicates a uniform amount of correction on the screen.

FIG. 8B is a schematic diagram showing an example of the amount of horizontal modulation factor correction and the amount of vertical modulation factor correction for a location on the screen, the amounts of correction being proportional to the first power of a distance from the center of the screen.

DESCRIPTION OF THE PREFERRED EMBODIMENT(S)

Figure 4:
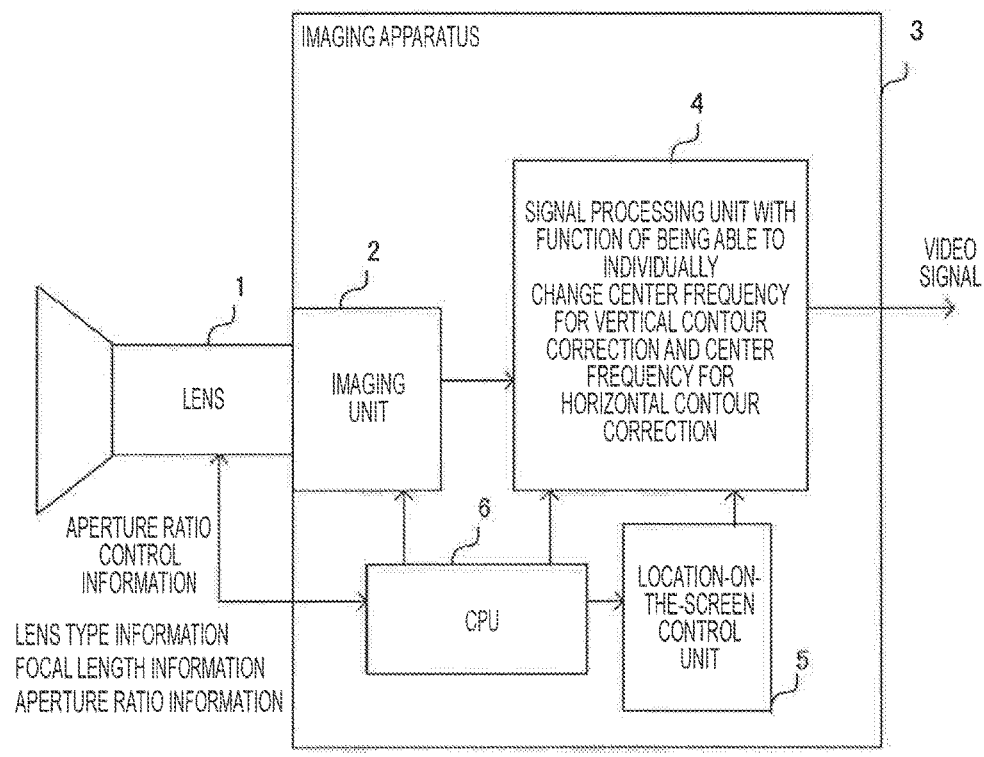
FIG. 4 is a block diagram showing an overall configuration of an imaging apparatus of one embodiment of the present invention.

FIG. 4 is a block diagram showing an overall configuration of an imaging apparatus of one embodiment of the present invention. In FIG. 4, 1: a lens, 2: an imaging unit, 3: an imaging apparatus, 4: a signal processing unit, 5: a location-on-the-screen control unit, and 6: a CPU.

The lens 1 is a lens in which a circumferential direction modulation factor and a radial direction modulation factor differ from each other. For example, the lens 1 is a lens in which spherical aberration, coma aberration, and chromatic aberration are corrected, but correction of astigmatism is required.

Light having transmitted through the lens 1 is inputted to the imaging unit 2 in the imaging apparatus 3. The light having been inputted to the imaging unit 2 is inputted to a charge coupled device (CCD) imaging device in the imaging unit 2. In the imaging unit 2, a process by an analog front end (AFE) is performed in which, for example, noise is removed from a signal outputted from the CCD imaging device by correlated double sampling (CDS), dark current correction is performed, the signal is amplified by an automatic gain controller (AGC), the signal is converted to a digital signal by an analog digital converter (ADC), and the digital video signal is outputted. The ADC grayscale of the AFE is, for example, 12 bits or 14 bits. The digital video signal is subjected to signal processing by the signal processing unit 4, by which, for example, a video signal for a wide-aspect ratio, high-resolution two-dimensional video display apparatus (not shown) is outputted.

The CPU 6 in the imaging apparatus 3 obtains type information, focal length information, and aperture ratio information of the lens 1 from an external source, obtains or computes circumferential direction modulation factor information for the focal length and aperture ratio of the lens 1 and radial direction modulation factor information for the focal length and the aperture ratio, and stores those pieces of information in the CPU 6 or an external storage means.

The CPU 6 includes a circuit that calculates, for each vertical or horizontal frequency, the amount of vertical contour (modulation factor) correction and the amount of horizontal contour (modulation factor) correction for a specific location on a screen of the two-dimensional video display apparatus (not shown), in association with a circumferential direction modulation factor and a radial direction modulation factor which are related to the astigmatism of the lens 1, based on the obtained lens type information, focal length information, and aperture ratio information and the stored circumferential direction modulation factor information and radial direction modulation factor information. Information to be outputted from the circuit is also referred to as "information on a relationship between a location on the screen and contour correction control". In addition, this calculated information is also "a horizontal pixel number and the amounts of correction for contour correction for each frequency".

The circuit can include a determination circuit that determines whether a video signal inputted from the lens 1 is a video signal obtained using a zoom lens in a wide-angle state, by accepting, as input, lens type information, focal length information, and aperture ratio information, and outputs a result of the determination. The circuit can include a circuit that calculates, if it is determined from the output from the determination circuit that a video signal inputted using a zoom lens in a wide-angle state is inputted to the imaging unit 2, the amount of correction where the center of a horizontal contour (modulation factor) correction frequency is reduced mainly around the left and right edges of the two-dimensional video display apparatus, as information on a relationship between a location on the screen and contour correction control, and outputs the information on a relationship between a location on the screen and contour correction control.

The circuit can include a determination circuit that determines whether a video signal inputted from the lens 1 is a video signal obtained using a zoom lens in a telephoto state, by accepting, as input, lens type information, focal length information, and aperture ratio information, and outputs a result of the determination. The circuit can include a circuit that calculates, if it is determined from the output from the determination circuit that a video signal inputted using a zoom lens in a telephoto state is inputted to the imaging unit 2, the amount of correction where the center of a vertical contour (modulation factor) correction frequency is reduced as going away in a left/right direction from the center of the screen of the two-dimensional video display apparatus, as information on a relationship between a location on the screen and contour correction control, and outputs the information on a relationship between a location on the screen and contour correction control.

The circuit can include a determination circuit that determines whether a video signal inputted from the lens 1 is a video signal obtained using a unifocal lens or a video signal obtained using a zoom lens in an intermediate focal length state, by accepting, as input, lens type information, focal length information, and aperture ratio information, and outputs a result of the determination. The circuit can include a circuit that calculates, if it is determined from the output from the determination circuit that a video signal obtained using a unifocal lens or a video signal obtained using a zoom lens in an intermediate focal length state is inputted to the imaging unit 2, the amount of correction where either one of the center of a vertical contour (modulation factor) correction frequency and the center of a horizontal contour (modulation factor) correction frequency is reduced as going away in a left/right direction from the center of the screen, in association with a circumferential direction modulation factor and a radial direction modulation factor which are related to the astigmatism of the unifocal lens or the intermediate focal length of the zoom lens, as information on a relationship between a location on the screen and contour correction control, and outputs the information on a relationship between a location on the screen and contour correction control.

The circuit can include a determination circuit that determines whether a video signal inputted from the lens 1 is a video signal obtained using a unifocal lens or a video signal obtained using a zoom lens in an intermediate focal length state, by accepting, as input, lens type information, focal length information, and aperture ratio information, and outputs a result of the determination. The circuit can include a circuit that calculates, if it is determined from the output from the determination circuit that a video signal obtained using a unifocal lens or a video signal obtained using a zoom lens in an intermediate focal length state is inputted to the imaging unit 2, the amount of correction where the center of a vertical contour (modulation factor) correction frequency and the center of a horizontal contour (modulation factor) correction frequency differ from each other as going away in a left/right direction from the center of the screen, in association with a circumferential direction modulation factor and a radial direction modulation factor which are related to the astigmatism of the unifocal lens or the intermediate focal length of the zoom lens, as information on a relationship between a location on the screen and contour correction control, and outputs the information on a relationship between a location on the screen and contour correction control.

The amount of vertical contour (modulation factor) correction and the amount of horizontal contour (modulation factor) correction for a specific location on the screen which are calculated by the above-described circuits can include the amount of correction proportional to the first power of a distance of a pixel from the center of the screen of the two-dimensional video display apparatus, the amount of correction proportional to the second power of the distance from the center of the screen, the amount of correction proportional to the third power of the distance from the center of the screen, the amount of correction proportional to the fourth power of the distance from the center of the screen, the amount of correction proportional to the sixth power of the distance from the center of the screen, and the amount of correction proportional to the eighth power of the distance from the center of the screen. The amount of vertical contour (modulation factor) correction and the amount of horizontal contour (modulation factor) correction for a specific location on the screen are not limited to the amounts of correction proportional to those factorials, and can be generalized by the amount of correction proportional to an nth power (n is an integer greater than or equal to 1) of the distance from the center of the screen.

The amount of vertical contour (modulation factor) correction or the amount of horizontal contour (modulation factor) correction for a specific location on the screen which is calculated by the circuits may be the amount of correction proportional to at least one factorial. For example, the amount of horizontal contour (modulation factor) correction can be the amount of modulation factor correction proportional to the eighth power of the distance from the center of the screen.

In addition, the amount of vertical contour (modulation factor) correction or the amount of horizontal contour (modulation factor) correction for a specific location on the screen which is calculated by the circuits may be obtained by combining together the amounts of correction proportional to a plurality of factorials. For example, the amount of correction proportional to the first power of a distance from a pixel at the center in a horizontal direction of the screen, the amount of correction proportional to the second power, the amount of correction proportional to the fourth power, the amount of correction proportional to the sixth power, and the amount of correction proportional to the eighth power may be combined together.

Note that a location proportional to the first power of a distance of a pixel corresponding to a video signal from the center of the screen is a location proportional to the value of a distance on the screen which is represented by the expression "h–H/2". Here, His the number of horizontal pixels of the two-dimensional video display apparatus, and h is the horizontal pixel number.

The location-on-the-screen control unit 5 calculates, for each of vertical frequencies for 0H to 7H contours, for example, the amount of vertical contour (modulation factor) correction for a specific location on the screen, based on the "information on a relationship between a location on the screen and contour correction control" outputted from the CPU 6 and at least a horizontal synchronizing signal and a pixel clock of the two-dimensional video display apparatus. In addition, the location-on-the-screen control unit 5 calculates, for each of horizontal frequencies for 0d to 7d contours, for example, the amount of horizontal contour (modulation factor) correction for a specific location on the screen, based on the "information on a relationship between a location on the screen and contour correction control" outputted from the CPU 6 and at least a horizontal synchronizing signal and a pixel clock of the two-dimensional video display apparatus.

In addition, the location-on-the-screen control unit 5 includes a horizontal pixel counter. In addition, the location-on-the-screen control unit 5 includes a means for detecting timing for a location on the screen of the video signal based on the above-described horizontal synchronizing signal and pixel clock. The location-on-the-screen control unit 5 outputs either one or both of a vertical contour correction control signal including the above-described amounts of vertical contour (modulation factor) correction and a horizontal contour correction control signal including the above-described amounts of horizontal contour (modulation factor) correction.

The location-on-the-screen control unit 5 individually calculates and outputs the amounts of frequency correction for modulation factors for horizontal contours (0d to 7d contours) and the amounts of frequency correction for modulation factors for vertical contours (0H to 7H contours), in association with a horizontal synchronizing signal and a horizontal pixel number counted by a pixel clock, based on the information on a relationship between a location on the screen and contour correction control which is generated by the CPU 6. Here, each of the amounts of frequency correction is calculated by combining together one or more of the amounts of correction proportional to an nth power of a distance (n is an integer greater than or equal to 0), such as the amount of correction proportional to a distance of a pixel corresponding to a video signal from the center of the screen (h−H/2 where H is the number of horizontal pixels and h is the horizontal pixel number), the amount of correction proportional to the second power of the distance of the pixel from the center of the screen, the amount of correction proportional to the fourth power of the distance of the pixel from the center of the screen, the amount of correction proportional to the sixth power of the distance of the pixel from the center of the screen, and the amount of correction proportional to the eighth power of the distance of the pixel from the center of the screen.

To the signal processing unit 4 is inputted a pre-correction signal which is the digitalized video signal from the imaging unit 2. To the signal processing unit 4 is (are) inputted either one or both of the vertical contour correction control signal and the horizontal contour correction control signal from the location-on-the-screen control unit 5.

The signal processing unit 4 performs horizontal contour (modulation factor) correction and vertical contour (modulation factor) correction, based on the amounts of frequency correction for modulation factors for horizontal contours (0d to 7d contours) and the amounts of frequency correction for modulation factors for vertical contours (0H to 7H contours) which are associated with the horizontal pixel number and which are outputted from the location-on-the-screen control unit 5.

Figure 5:
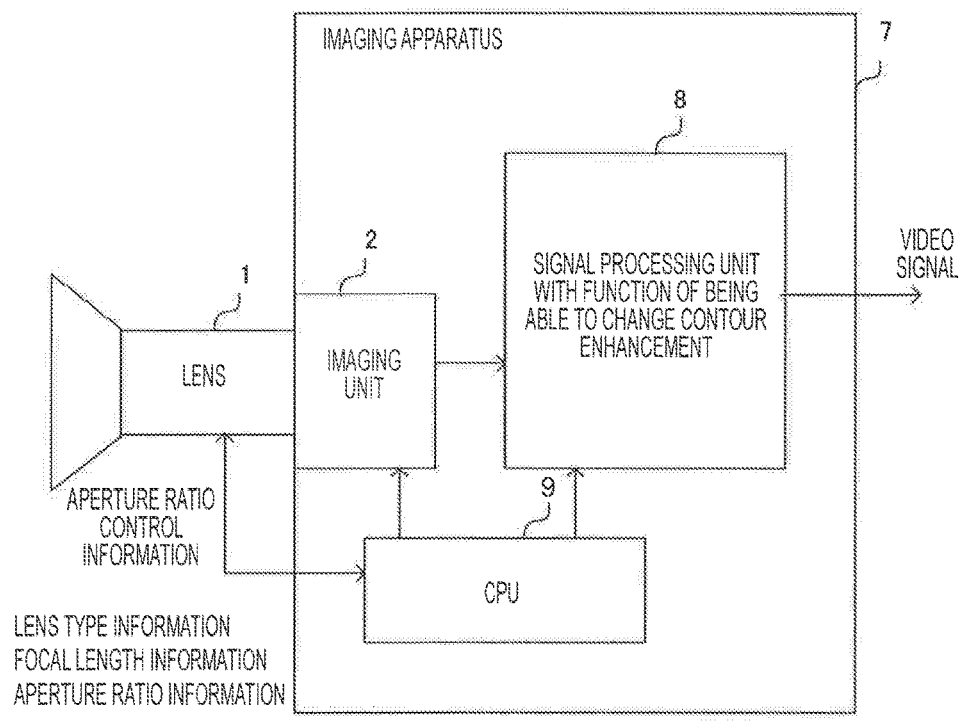
FIG. 5 is a block diagram showing an overall configuration of an imaging apparatus of conventional art.

In WO 2014/112622 A1 (Patent Literature 1) for PCT/JP2014/050974 which is filed previously by the applicant, the applicant discloses an imaging apparatus in which the signal processing unit 4 has a function of being able to change contour enhancement (FIG. 5). The present invention includes a horizontal contour correction circuit and a vertical contour correction circuit for multi-frequency enhancement or a horizontal aperture (modulation factor) correction circuit and a vertical aperture (modulation factor) correction circuit for multi-frequency enhancement which are disclosed in WO 2014/112622 A1 described above.

In FIG. 4, the signal processing unit 4 has a circuit that includes eight or more line memories and generates a vertical contour correction signal from each of a plurality of video signals which are delayed by an integer horizontal period. In addition, the signal processing unit 4 includes a circuit that includes eight or more pixel delay units and generates a horizontal contour correction signal from each of a plurality of video signals which are delayed by an integer pixel quantity. In addition, the imaging apparatus 3 can include a signal processing unit capable of changing each of a center frequency for correcting vertical contour and a center frequency for correcting horizontal contour. To attain the above-described object, in the present invention, an imaging apparatus having a wide aspect ratio such as 16:9 or 2:1 and having high resolution which is at least high definition (HD) such as 1K, 2K, 4K, or 8K uses horizontal contour correction and vertical contour correction for multi-frequency enhancement or horizontal aperture (modulation factor) correction and vertical aperture (modulation factor) correction for multi-frequency enhancement. This will be described using FIGS. 1A, 1B, 1C, 1D, and 4.

The signal processing unit 4 may include a circuit that performs vertical contour (modulation factor) correction for each of 0H to 7H contours, based on the vertical contour correction control signal inputted from the location-on-the-screen control unit 5. The signal processing unit 4 may include a circuit that performs vertical contour (modulation factor) correction for all of 0H to 7H contours. In addition, the signal processing unit 4 may include a circuit that performs vertical contour (modulation factor) correction for any one or more of the 0H to 7H contours.

Figure 1A:
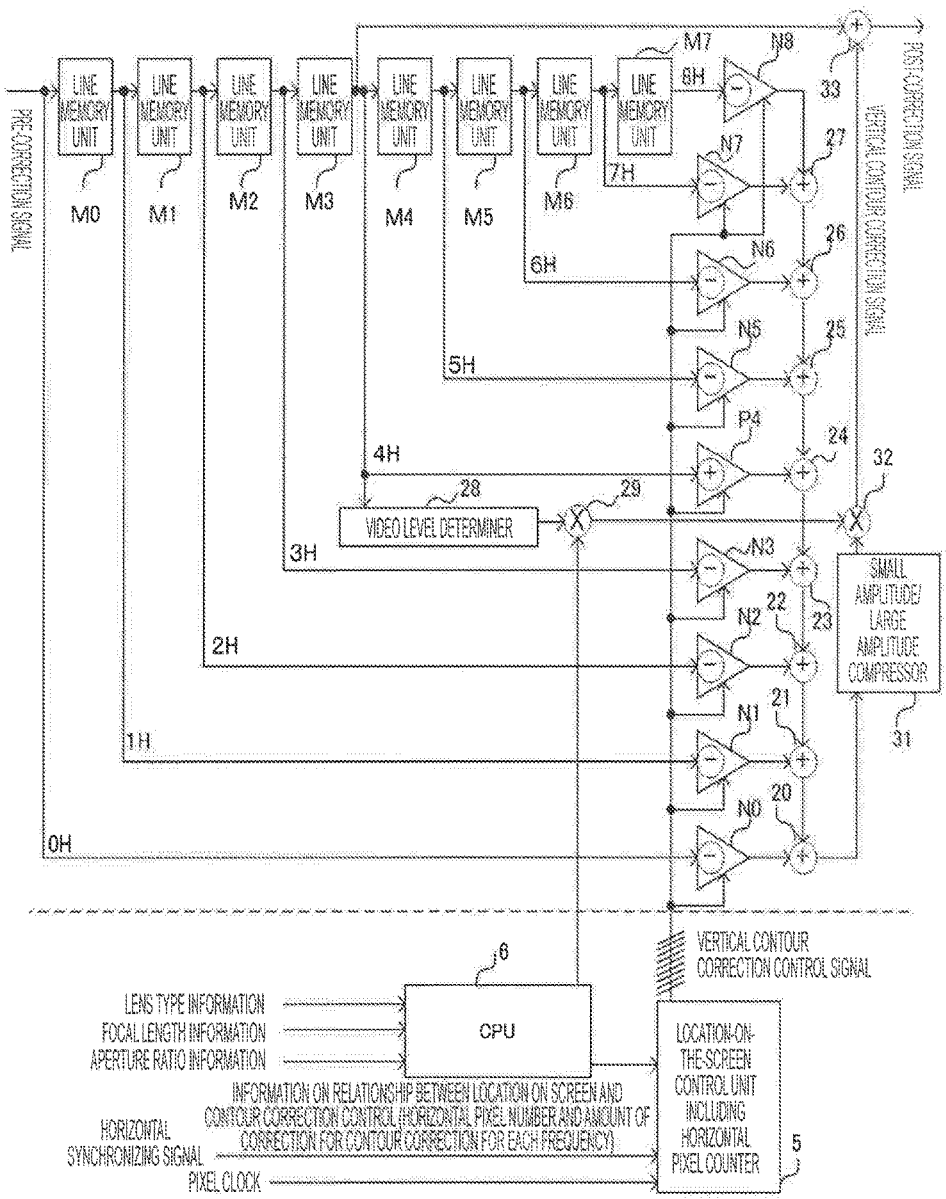
FIG. 1A is a detailed block diagram of a multi-scanning line (H) vertical contour correction circuit of one embodiment of the present invention.

As one embodiment of the signal processing unit 4, a multi-scanning line (H) vertical contour correction circuit will be described using FIG. 1A. Line memory units M0 to M7 of FIG. 1A are temporary delay means for extracting a pre-correction signal at eight contour timings. A contour correction signal is generated by the addition and subtraction of signals read from these line memory units M0 to M7. N0, N1, N2, N3, N5, N6, N7, and N8 of FIG. 1A are subtractors (negative adders). As shown in FIG. 1A, the pre-correction signals extracted at eight contour timings are inputted to the subtractors N0, N1, N2, N3, N5, N6, N7, and N8 at their respective timings. In addition, a pre-correction signal corresponding to the center of the screen is extracted, for example, as a 4H contour signal from between the line memory units M3 and M4 of FIG. 1A.

Contour signals 0H, 1H, 2H, 3H, 5H, 6H, 7H, and 8H at their respective timings which are inputted to the subtractors N0, N1, N2, N3, N5, N6, N7, and N8, respectively, are subtracted based on a vertical contour correction control signal outputted from the location-on-the-screen control unit 5. An output from the subtractor N8 is added to an output from the subtractor N7 by an adder 27. An output from the adder 27 is added to an output from the subtractor N6 by an adder 26. An output from the adder 26 is added to an output from the subtractor N5 by an adder 25. Note that the vertical contour correction control signal outputted from the location-on-the-screen control unit 5 is added to the 4H contour signal by an adder P4. An output from the adder 25 is added to an output from the adder P4 by an adder 24.

Then, as shown in FIG. 1A, outputs from the subtractors N3, N2, N1, and N0 are sequentially added to an output from the adder 24 by adders 23, 22, 21, and 20, and a result of the addition is inputted to a small amplitude/large amplitude compressor 31. The small amplitude/large amplitude compressor 31 compresses a small-amplitude signal or large-amplitude signal obtained after the addition. A video level of the 4H contour signal is determined by a video level determiner 28, and then the 4H contour signal is mixed with a signal indicating information on a relationship between a screen's center position and contour correction control which is outputted from the CPU 6. The mixed signal is thereafter mixed with an output signal from the small amplitude/large amplitude compressor 31. Here, the mixed signal is added, as a vertical contour correction signal, to the 4H contour signal and the resulting signal is outputted as a post-correction signal.

In addition, the signal processing unit 4 may include a circuit that performs horizontal contour (modulation factor) correction for each of 0d to 7d contours, based on a horizontal contour correction control signal inputted from the location-on-the-screen control unit 5. The signal processing unit 4 may include a circuit that performs horizontal contour (modulation factor) correction for all of the 0d to 7d contours. In addition, the signal processing unit 4 may include a circuit that performs horizontal contour (modulation factor) correction for any one or more of the 0d to 7d contours.

Figure 1B:
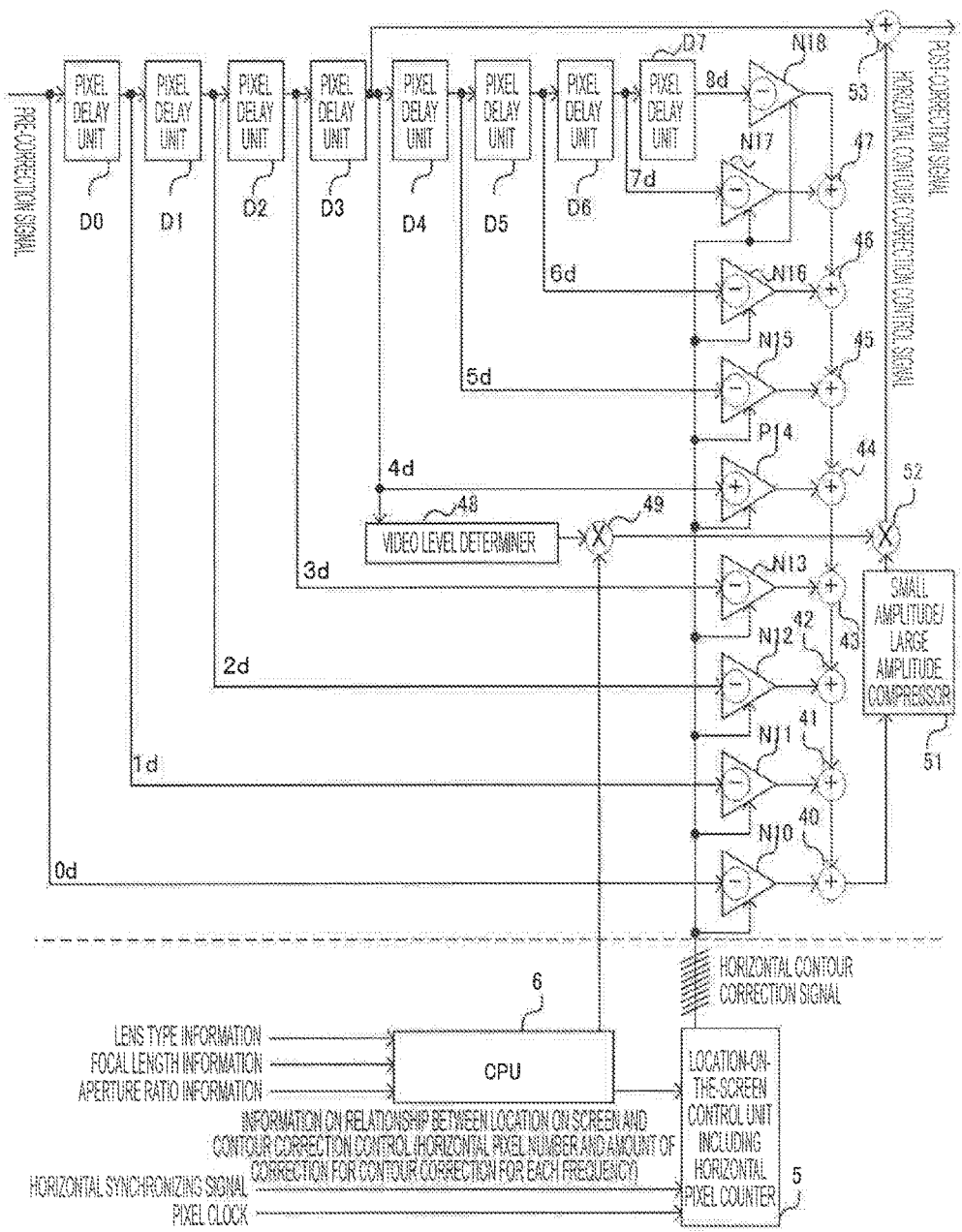
FIG. 1B is a detailed block diagram of a multi-pixel horizontal contour correction circuit of one embodiment of the present invention.

As one embodiment of the signal processing unit 4, a multi-pixel horizontal contour correction circuit will be described using FIG. 1B. Pixel delay units D0 to D7 of FIG. 1B are temporary delay means for extracting a pre-correction signal at eight contour timings. A contour correction signal is generated by the addition and subtraction of signals read from these pixel delay units D0 to D7. N10, N11, N12, N13, N15, N16, N17, and N18 of FIG. 1B are subtractors (negative adders). As shown in FIG. 1B, the pre-correction signals extracted at eight contour timings are inputted to the subtractors N10, N11, N12, N13, N15, N16, N17, and N18 at their respective timings. In addition, a pre-correction signal corresponding to the center of the screen is extracted, for example, as a 4d contour signal from between the pixel delay units D3 and D4 of FIG. 1B.

Contour signals 0d, 1d, 2d, 3d, 5d, 6d, 7d, and 8d at their respective timings which are inputted to the subtractors N10, N11, N12, N13, N15, N16, N17, and N18, respectively, are subtracted based on a horizontal contour correction control signal outputted from the location-on-the-screen control unit 5. An output from the subtractor N18 is added to an output from the subtractor N17 by an adder 47. An output from the adder 47 is added to an output from the subtractor N16 by an adder 46. An output from the adder 46 is added to an output from the subtractor N15 by an adder 45. Note that the horizontal contour correction control signal outputted from the location-on-the-screen control unit 5 is added to the 4d contour signal by an adder P14. An output from the adder 45 is added to an output from the adder P14 by an adder 44.

Then, as shown in FIG. 1B, outputs from the subtractors N13, N12, N11, and N10 are sequentially added to an output from the adder 44 by adders 43, 42, 41, and 40, and a result of the addition is inputted to a small amplitude/large amplitude compressor 51. The small amplitude/large amplitude compressor 51 compresses a small-amplitude signal or large-amplitude signal obtained after the addition. A video level of the 4d contour signal is determined by a video level determiner 48, and then the 4d contour signal is mixed with a signal indicating information on a relationship between a screen's center position and contour correction control which is outputted from the CPU 6. The mixed signal is thereafter mixed with an output signal from the small amplitude/large amplitude compressor 51. Here, the mixed signal is added, as a horizontal contour correction signal, to the 4d contour signal and the resulting signal is outputted as a post-correction signal.

Note that it is preferred that each of the number of the subtractors N0, N1, N2, N3, N5, N6, N7, and N8 of FIG. 1A, the number of the subtractors N10, N11, N12, N13, N15, N16, N17, and N18 of FIG. 1B, the number of the line memory units M0 to M7 of FIG. 1A, and the number of the pixel delay units D0 to D7 of FIG. 1B be seven or more or four or six.

The present invention can be applied to high-resolution imaging apparatuses for television cameras that have a nearly square aspect ratio such as 4:3 or 3:2 and that are at least HD such as 1K, 2K, 4K, or 8K. In this case, oblique upper right contour correction and oblique upper left contour correction or oblique upper right aperture (modulation factor) correction and oblique upper left aperture (modulation factor) correction are performed. In this embodiment, the CPU 6 includes a circuit that calculates, for each oblique frequency, the amount of oblique upper right contour (modulation factor) correction and the amount of oblique upper left contour (modulation factor) correction for a specific location on the screen of the two-dimensional video display apparatus (not shown), based on the obtained lens type information, focal length information, and aperture ratio information and the stored circumferential direction modulation factor information and radial direction modulation factor information.

Figure 1C:
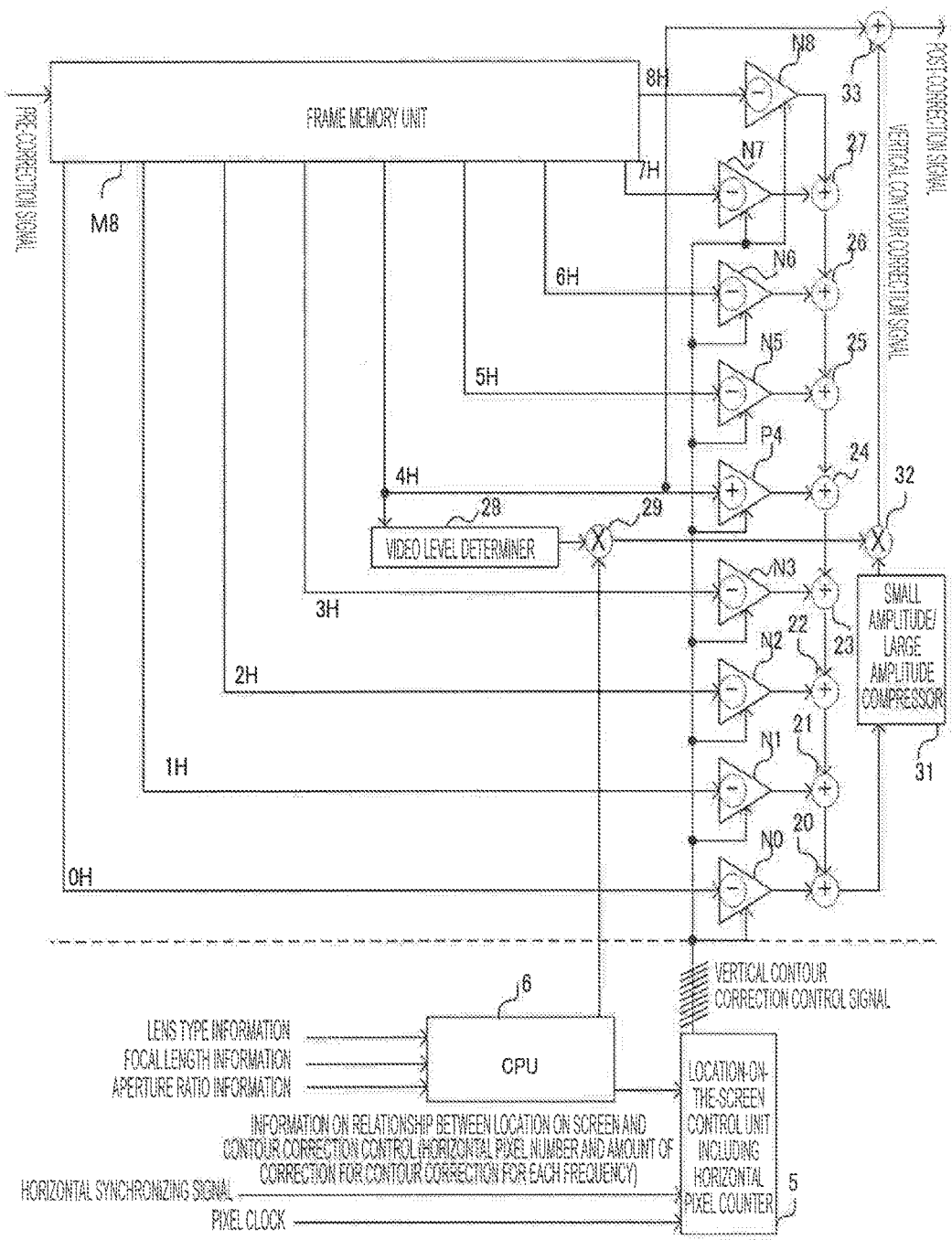
FIG. 1C is a detailed block diagram of a multi-scanning line (H) vertical contour correction circuit of one embodiment of the present invention.
Figure 1D:
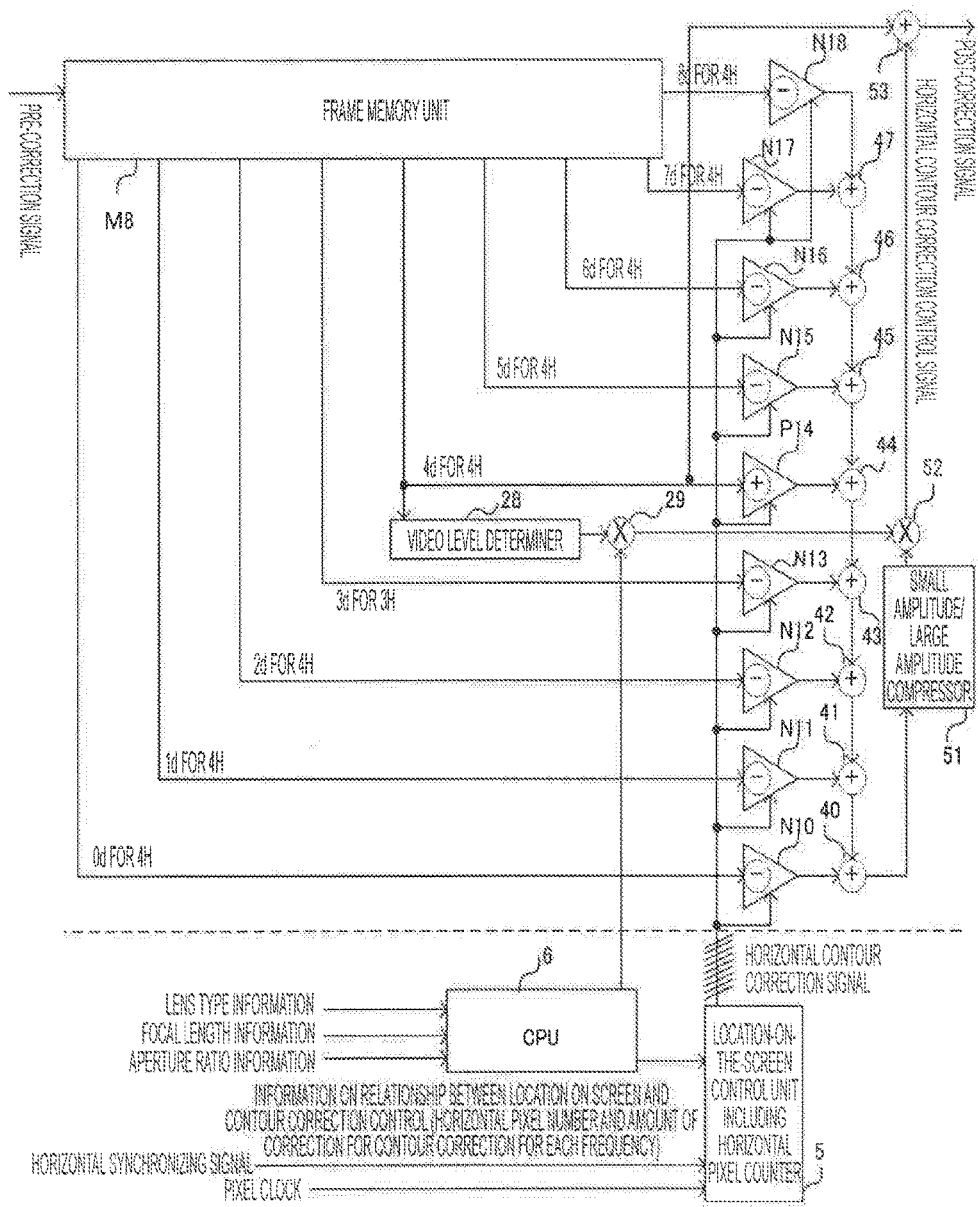
FIG. 1D is a detailed block diagram of a multi-pixel horizontal contour correction circuit of one embodiment of the present invention.

In this embodiment, as one embodiment of the signal processing unit 4, a multi-pixel horizontal contour correction circuit is shown in FIG. 1D. A pre-correction video signal is inputted to a frame memory unit M8. This circuit generates a contour correction signal by the addition and subtraction of signals read from the frame memory unit M8.

The present invention can be applied to wide-aspect ratio imaging apparatuses that use a lens. In the present invention, an imaging apparatus can individually change the center frequency of VDTL and the center frequency of HDTL at the left and right positions on a screen.

Effect of the Invention

When a video signal processing method of the present invention is applied, a modulation factor of a lens in which a circumferential direction modulation factor and a radial direction modulation factor significantly differ from each other is corrected, enabling to output a video signal having been subjected to contour correction with suppressed overshoot and undershoot. Hence, it becomes easier to put cameras (UHDTVs) including an affordable 4K or 8K lens into commercial production.

First Embodiment

FIG. 1A is a detailed block diagram of a multi-scanning line (H) vertical contour correction circuit of one embodiment of the present invention. A CPU 6 generates information on a relationship between a location on the screen and contour correction control, from lens information such as lens type information, focal length information, and aperture ratio information. The information on a relationship between a location on the screen and contour correction control may be a horizontal pixel number and the amounts of frequency correction for contour correction.

A location-on-the-screen control unit 5 including a horizontal pixel counter may be a means for individually calculating the amount of horizontal contour (modulation factor) frequency (0d to 7d contours) correction and the amount of vertical contour (modulation factor) frequency (0H to 7H contours) correction for, for example, a location proportional to a distance of a pixel corresponding to a video signal from the center of the screen (h−H/2 where H is the number of horizontal pixels and h is the horizontal pixel number), a location proportional to the second power of the distance of the pixel from the center of the screen, a location proportional to the fourth power of the distance of the pixel from the center of the screen, a location proportional to the sixth power of the distance of the pixel from the center of the screen, and a location proportional to the eighth power of the distance of the pixel from the center of the screen, based on the generated information on a relationship between a location on the screen and contour correction control, a horizontal synchronizing signal, and a horizontal pixel number from the horizontal pixel counter by a pixel clock.

FIG. 1B is a detailed block diagram of a multi-pixel horizontal contour correction circuit of one embodiment of the present invention.

FIG. 1C is a detailed block diagram of a multi-scanning line (H) vertical color averaging circuit of one embodiment of the present invention. A circuit that generates a contour correction signal by the addition and subtraction of read signals from a frame memory may be used.

FIG. 1D is a detailed block diagram of a multi-pixel horizontal color averaging circuit of one embodiment of the present invention. A circuit that generates a contour correction signal by the addition and subtraction of read signals from a frame memory may be used.

The reference signs in the drawings indicate as follows: 20 to 27 and 40 to 47: an adder, 28 and 48: a video level determiner, 6: a CPU, 31 and 51: a small amplitude/large amplitude compressor, 29, 49, 32, and 52: a multiplier, M0 to M7: a line memory unit, D0 to D7: a pixel delay unit, and N0 to N3, and N5 to N8, and N10 to N13, and N15 to N18: a negative multiplier, P1, P4, P11 and P14: a positive multiplier.

Figure 2A:
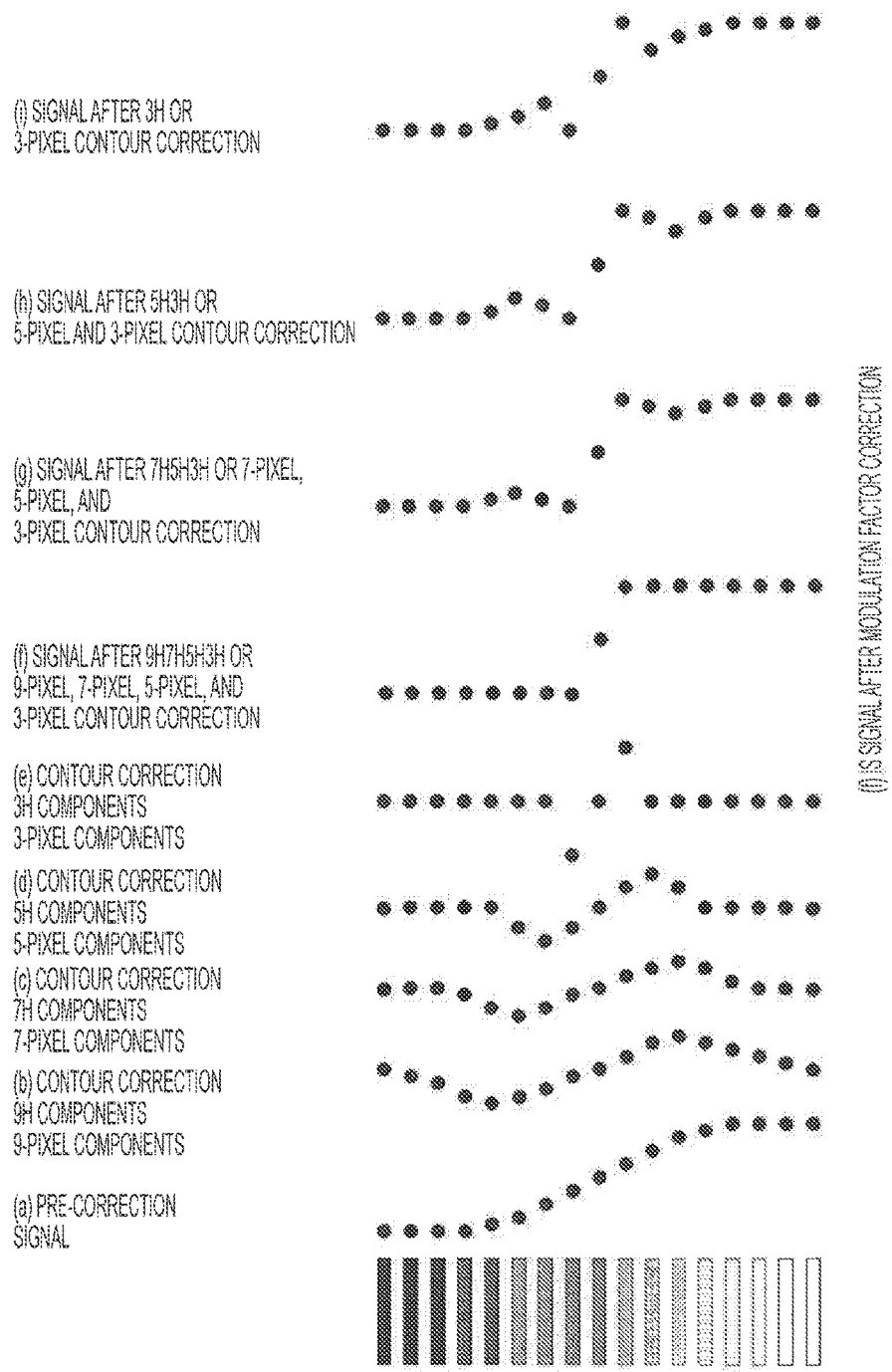
FIG. 2A is a schematic diagram (for checking) showing the generation of multi-scanning line (H) vertical contour correction signals or multi-pixel horizontal contour correction signals of one embodiment of the present invention.
Figure 3A:
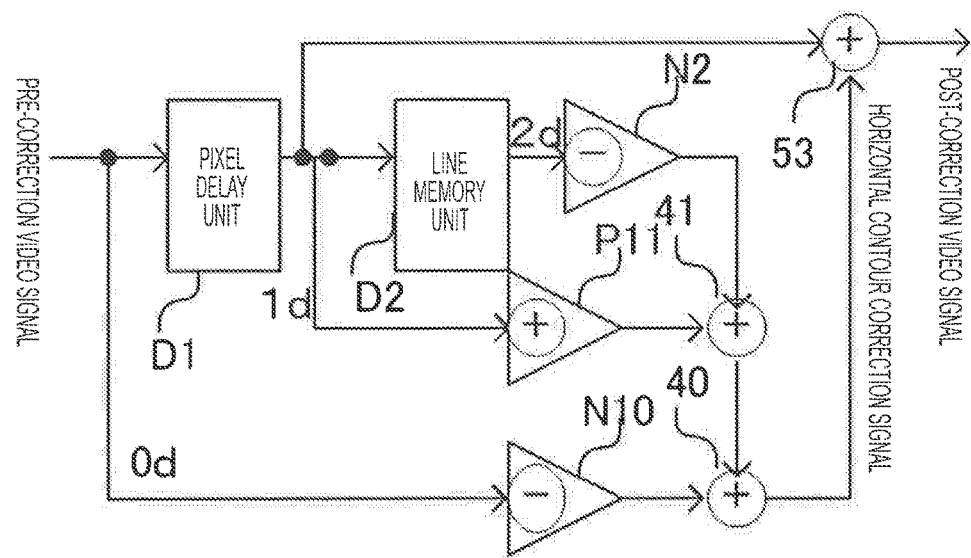
FIG. 3A is a diagram showing a visible-light horizontal contour correction signal generating circuit of conventional art.
Figure 3B:
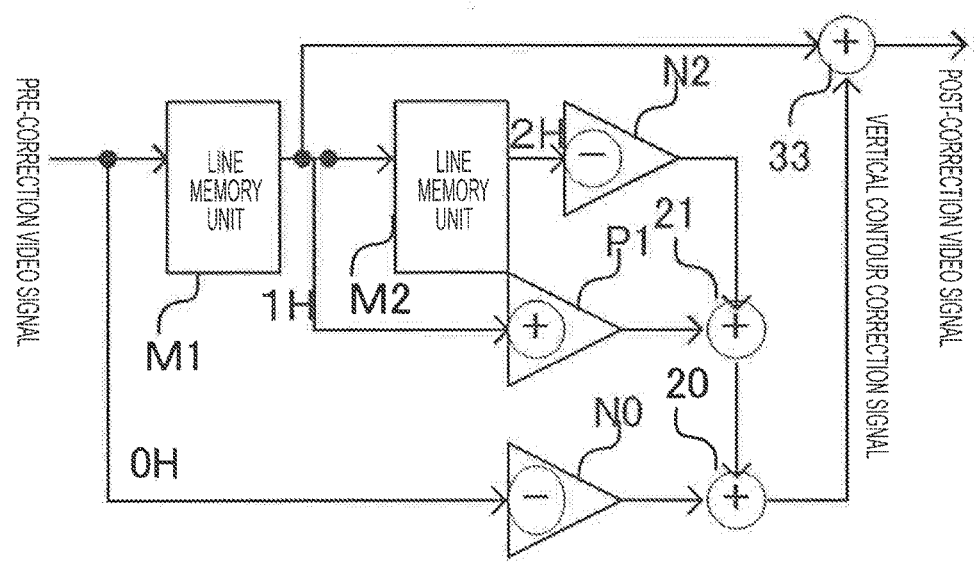
FIG. 3B is a diagram showing a visible-light vertical contour correction signal generating circuit of conventional art.

FIG. 2A is a schematic diagram for checking that shows the generation of multi-scanning line (H) vertical contour correction signals or multi-pixel horizontal contour correction signals of one embodiment of the present invention. (a) shows the generation of a signal before vertical contour correction, (b) shows the generation of a vertical contour 9H (horizontal contour 9 pixels) component correction signal, (c) shows the generation of a vertical contour 7H (horizontal contour 7 pixels) component correction signal, (d) shows the generation of a vertical contour 5H (horizontal contour 5 pixels) component correction signal, (e) shows the generation of a vertical contour 3H (horizontal contour 3 pixels) component correction signal, (f) shows the generation of a signal after vertical contour 9H7H5H3H (horizontal contour 9 pixels, 7 pixels, 5 pixels, and 3 pixels) correction, (g) shows the generation of a signal after vertical contour 7H5H3H (horizontal contour 7 pixels, 5 pixels, and 3 pixels) correction, (h) shows the generation of a signal after vertical contour 5H3H (horizontal contour 5 pixels and 3 pixels) correction, and (i) shows the generation of a signal after vertical contour 3H (horizontal contour 3 pixels) correction.

FIG. 2B is a schematic diagram for measurement that shows the generation of multi-scanning line (H) vertical contour correction signals or multi-pixel horizontal contour correction signals of one embodiment of the present invention. (a) shows the generation of a signal before vertical contour correction, (b) shows the generation of a vertical contour 9H (horizontal contour 9 pixels) component correction signal, (c) shows the generation of a vertical contour 7H (horizontal contour 7 pixels) component correction signal, (d) shows the generation of a vertical contour 5H (horizontal contour 5 pixels) component correction signal, (e) shows the generation of a vertical contour 3H (horizontal contour 3 pixels) component correction signal, (f) shows the generation of a signal after vertical contour 9H7H5H3H (horizontal contour 9 pixels, 7 pixels, 5 pixels, and 3 pixels) correction, (g) shows the generation of a signal after vertical contour 7H5H3H (horizontal contour 7 pixels, 5 pixels, and 3 pixels) correction, (h) shows the generation of a signal after vertical contour 5H3H (horizontal contour 5 pixels and 3 pixels) correction, and (i) shows the generation of a signal after vertical contour 3H (horizontal contour 3 pixels) correction.

In FIG. 2A or 2B, (a) shows a pre-correction signal, (b) shows a correction signal for vertical contour 9H components or horizontal contour 9-pixel components, (c) shows a correction signal for vertical contour 7H components or horizontal contour 7-pixel components, (d) shows a correction signal for vertical contour 5H components or horizontal contour 5-pixel components, (e) shows a correction signal for vertical contour 3H components or horizontal contour 3-pixel components, (f) shows a post-correction signal for vertical contour 9H, 7H, 5H, and 3H components or horizontal contour 9-pixel, 7-pixel, 5-pixel, and 3-pixel components, (g) shows a post-correction signal for vertical contour 7H, 5H, and 3H components or horizontal contour 7-pixel, 5-pixel, and 3-pixel components, (h) shows a post-correction signal for vertical contour 5H and 3H components or horizontal contour 5-pixel and 3-pixel components, and (i) shows a post-correction signal for vertical contour 3H components or horizontal contour 3-pixel components.

That is, in the present invention, by adding up the correction signal for vertical contour 9H components in (b), the correction signal for vertical contour 7H components in (c), the correction signal for vertical contour 5H components in (d), and the correction signal for vertical contour 3H components in (e), in the signal after vertical contour 9H7H5H3H correction in (f) a vertical contour is reproduced and there is almost no overshot or undershoot, and thus, even if the circumferential direction modulation factor and the radial direction modulation factor are individually reduced, contour correction can be individually performed.

In addition, in the present invention, by adding up the correction signal for horizontal contour 9-pixel components in (b), the correction signal for horizontal contour 7-pixel components in (c), the correction signal for horizontal contour 5-pixel components in (d), and the correction signal for horizontal contour 3-pixel components in (e), in the signal after horizontal contour 9-pixel, 7-pixel, 5-pixel, and 3-pixel correction in (f) a horizontal contour is reproduced and there is almost no overshot or undershoot, and thus, even if the circumferential direction modulation factor and the radial direction modulation factor are individually reduced, contour correction can be individually performed.

On the other hand, (i) shows a signal after vertical contour 3H correction to which conventional vertical contour correction for visible light is applied, and a false negative vertical contour occurs before or after a vertical contour due to overshoot or undershoot, and thus, if the circumferential direction modulation factor and the radial direction modulation factor are individually reduced, it becomes difficult to individually perform contour correction.

Figure 6A:
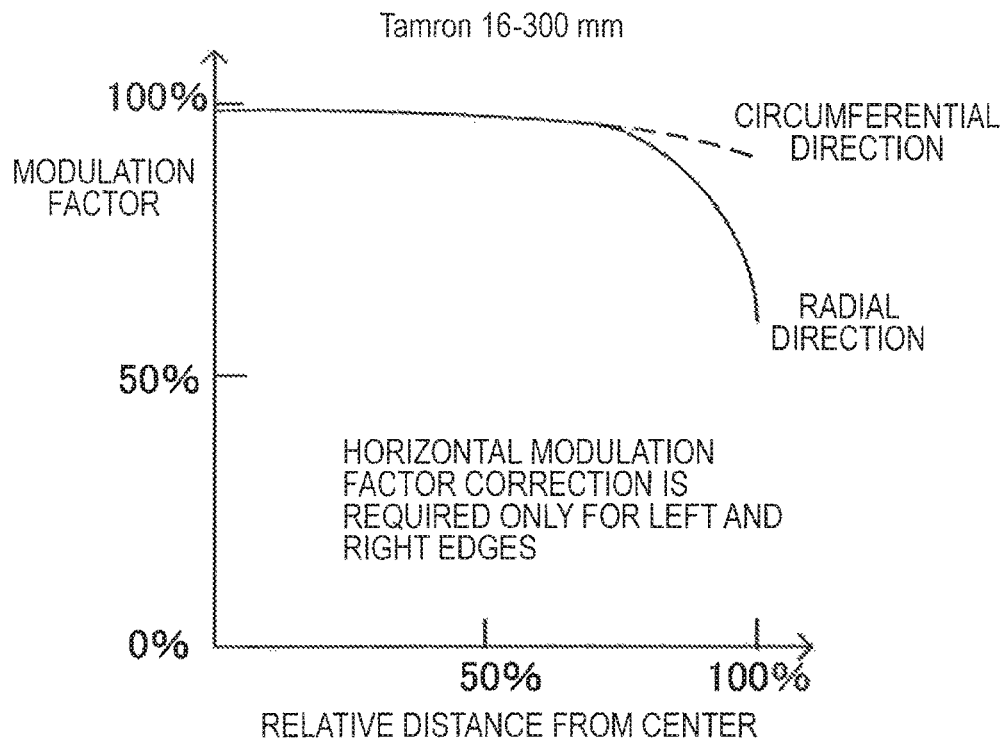
FIG. 6A is a schematic diagram showing changes in the modulation factors of a lens in which astigmatism is insufficiently corrected, and showing an example of a wide-angle end of a zoom lens.

FIG. 6A is a schematic diagram showing changes in the modulation factors of a lens in which astigmatism is insufficiently corrected. When a Tamron 16-300 mm (trade name)

lens is used at a wide-angle end of a zoom lens, horizontal modulation factor correction is required only for areas near the left and right edges.

Figure 6B:
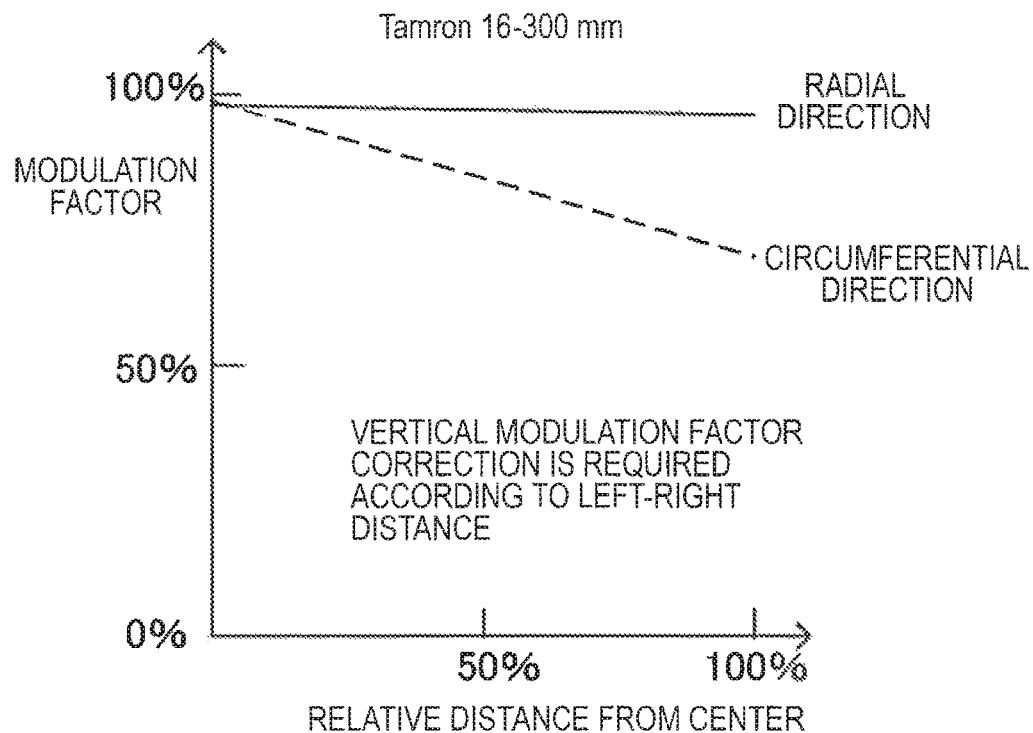
FIG. 6B is a schematic diagram showing changes in the modulation factors of a lens in which astigmatism is insufficiently corrected, and showing an example of a telephoto end of the zoom lens.

FIG. 6B is a schematic diagram showing changes in the modulation factors of a lens in which astigmatism is insufficiently corrected. When a Tamron 16-300 mm (trade name) lens is used at a telephoto end of a zoom lens, vertical modulation factor correction is required in proportion to a left-right distance.

Figure 6C:
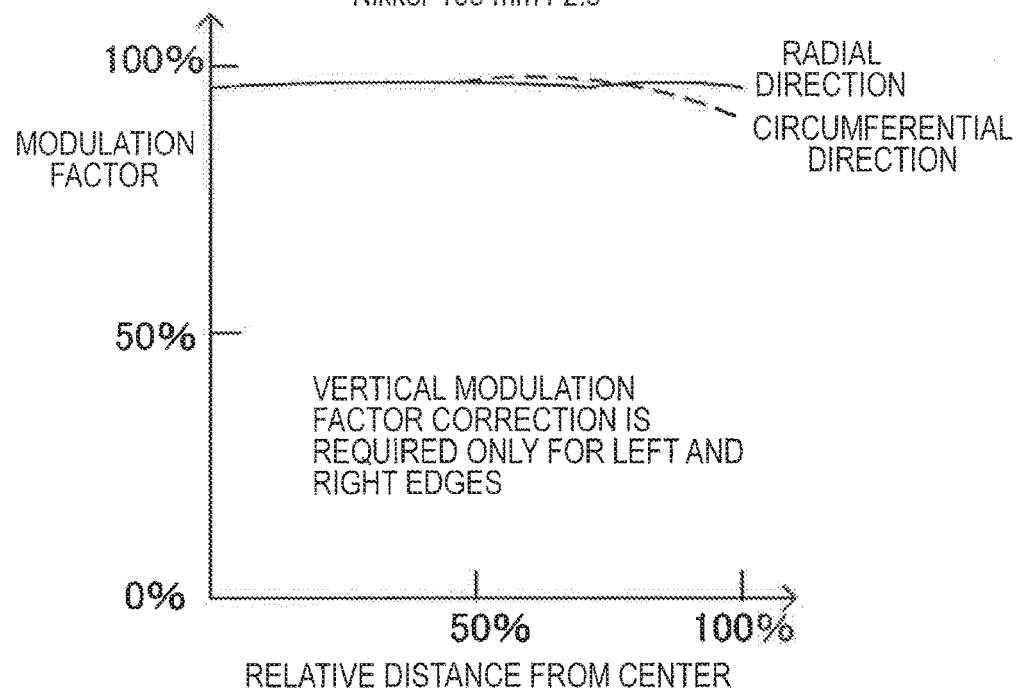
FIG. 6C is a schematic diagram showing changes in the modulation factors of a lens in which astigmatism is insufficiently corrected, and showing an example of a medium telephoto lens.

FIG. 6C is a schematic diagram showing changes in the modulation factors of a lens in which astigmatism is insufficiently corrected. When a Nikkor 105 mm F2.8 (trade name) which is a medium telephoto lens is used, vertical modulation factor correction is required for areas near the left and right edges.

Figure 6D:
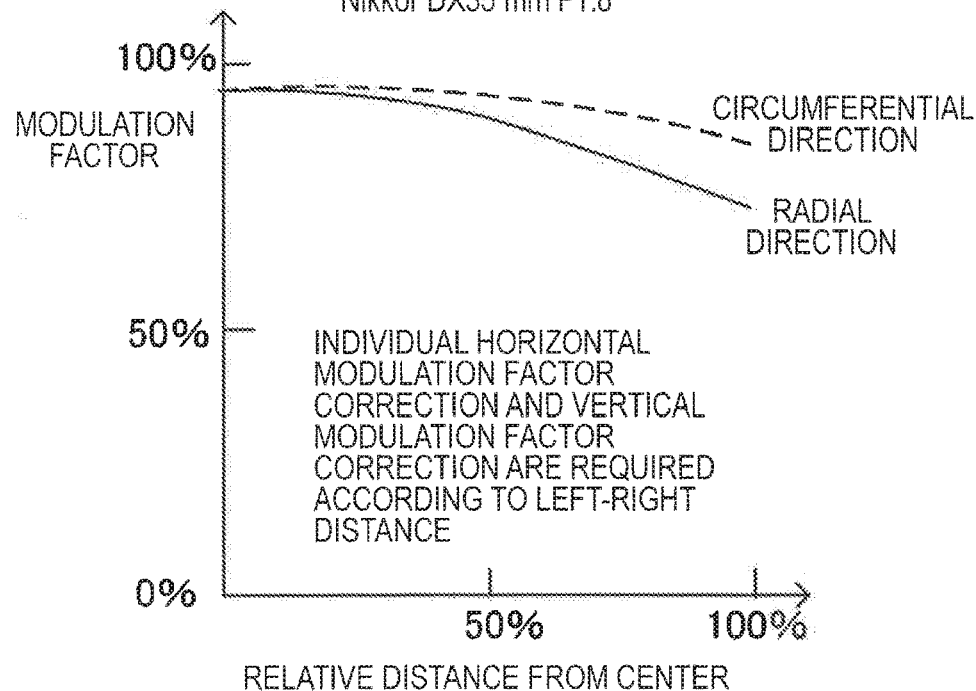
FIG. 6D is a schematic diagram showing changes in the modulation factors of a lens in which astigmatism is insufficiently corrected, and showing an example of a telephoto end of a standard lens.

FIG. 6D is a schematic diagram showing changes in the modulation factors of a lens in which astigmatism is insufficiently corrected. When a Nikkor DX 35 mm F1.8 (trade name) which is a standard lens is used, each of horizontal modulation factor correction and vertical modulation factor correction is required in proportion to a left-right distance.

Figure 7A:
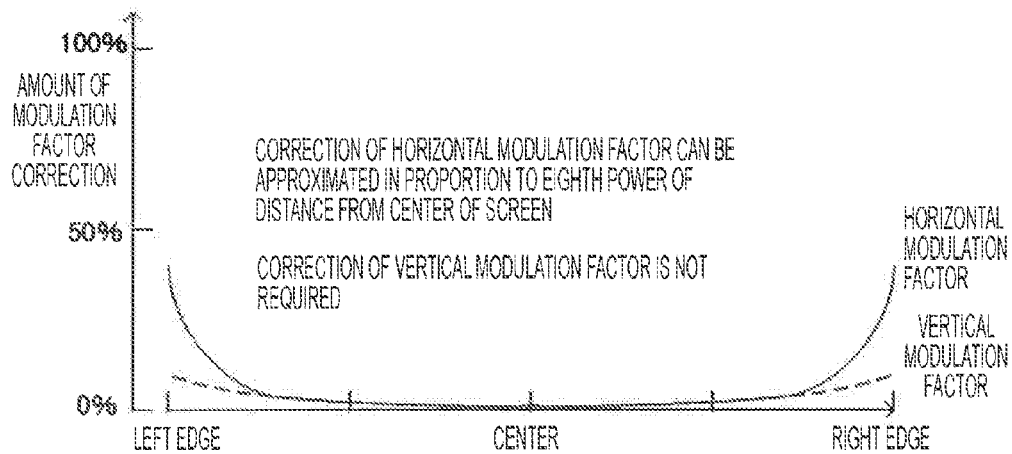
FIG. 7A is a schematic diagram showing an example of the correction of a modulation factor of the wide-angle end of the zoom lens.

FIG. 7A is a schematic diagram showing the correction of a modulation factor of a wide-angle end of a zoom lens for a case in which a Tamron 16-300 mm (trade name) lens is used at a wide-angle end of a zoom lens. Correction of a horizontal modulation factor proportional to the eighth power of a distance from the center of the screen can be approximated.

Figure 7B:
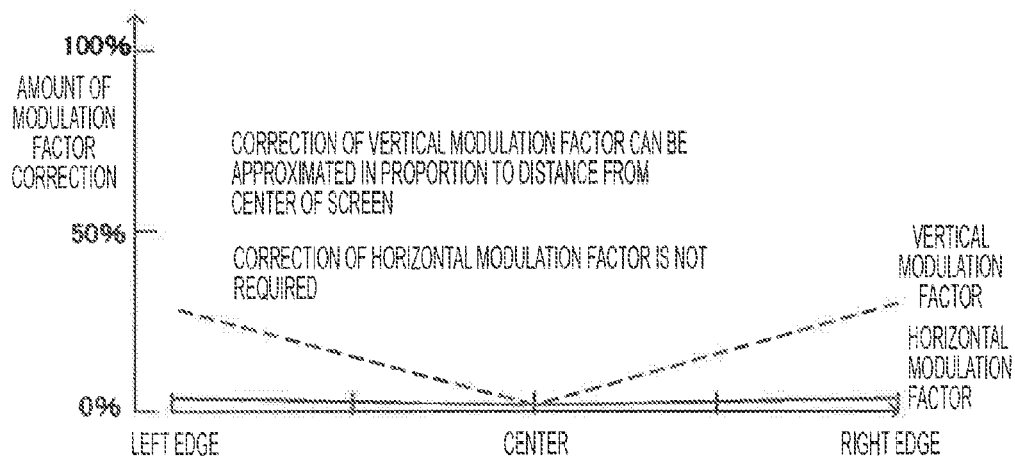
FIG. 7B is a schematic diagram showing an example of the correction of a modulation factor of the telephoto end of the zoom lens.

FIG. 7B is a schematic diagram showing the correction of a modulation factor of a telephoto end of a zoom lens for a case in which a Tamron 16-300 mm (trade name) lens is used at a telephoto end of a zoom lens. Correction of a vertical modulation factor can be approximated in proportion to a distance from the center of the screen. Correction of a horizontal modulation factor is not required.

Figure 7C:
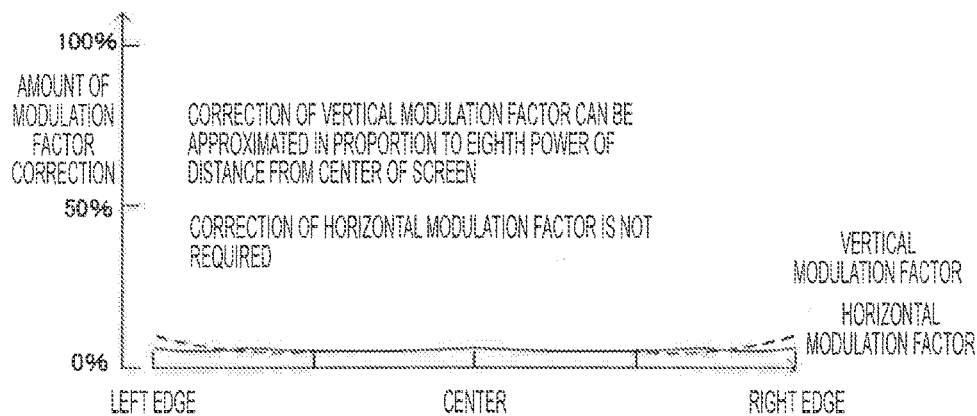
FIG. 7C is a schematic diagram showing an example of the correction of a modulation factor of the medium telephoto lens.

FIG. 7C is a schematic diagram showing the correction of a modulation factor of a Nikkor 105 mm F2.8 (trade name) which is a medium telephoto lens. Correction of a vertical modulation factor proportional to the eighth power of a distance from the center of the screen can be approximated. Correction of a horizontal modulation factor is not required.

Figure 7D:
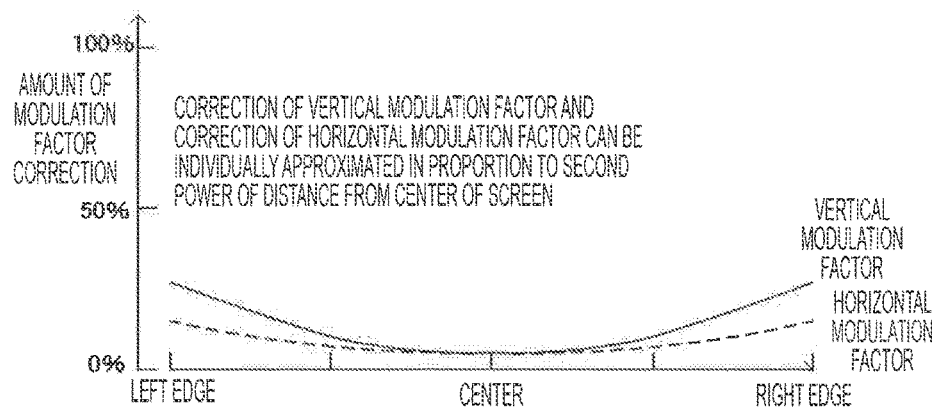
FIG. 7D is a schematic diagram showing an example of the correction of the modulation factors of the standard lens.

FIG. 7D is a schematic diagram showing the correction of the modulation factors of a Nikkor DX 35 mm F1.8 (trade name) which is a standard lens. Each of vertical modulation factor correction and horizontal modulation factor correction can be approximated in proportion to the second power of a distance from the center of the screen.

FIG. 8A is a schematic diagram showing the amount of horizontal modulation factor correction and the amount of vertical modulation factor correction for a location on the screen. The zero-order indicates a uniform amount of correction on the screen.

FIG. 8B is a schematic diagram showing the amount of horizontal modulation factor correction and the amount of vertical modulation factor correction for a location on the screen. FIG. 8B shows the amounts of correction proportional to the first power of a distance from the center of the screen.

Figure 8C:
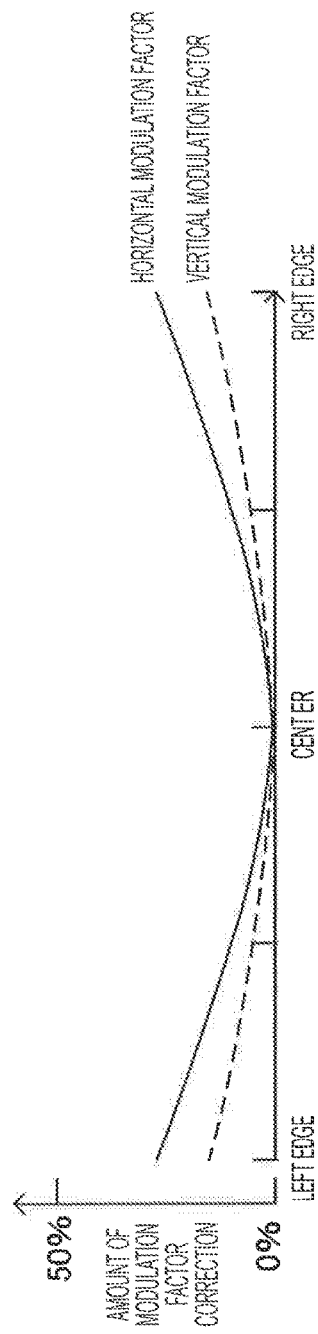
FIG. 8C is a schematic diagram showing an example of the amount of horizontal modulation factor correction and the amount of vertical modulation factor correction for a location on the screen, the amounts of correction being proportional to the second power of a distance from the center of the screen.

FIG. 8C is a schematic diagram showing the amount of horizontal modulation factor correction and the amount of vertical modulation factor correction for a location on the screen. FIG. 8C shows the amounts of correction proportional to the second power of a distance from the center of the screen.

Figure 8D:
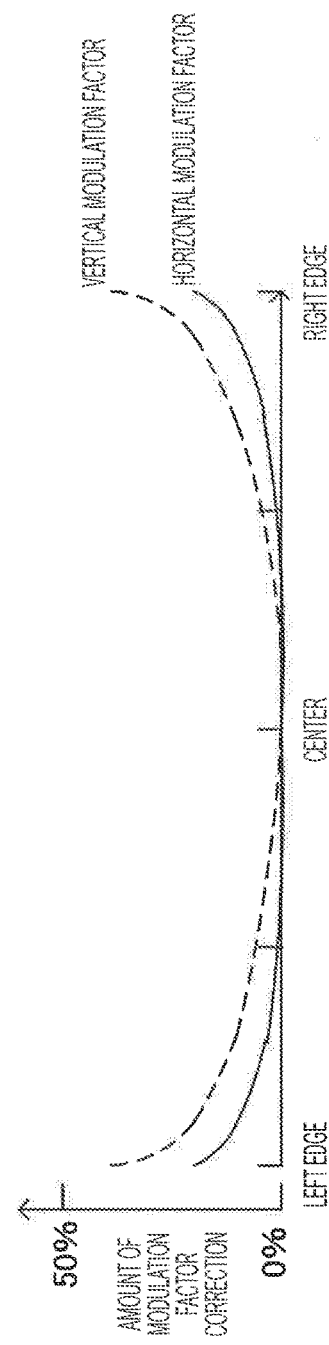
FIG. 8D is a schematic diagram showing an example of the amount of horizontal modulation factor correction and the amount of vertical modulation factor correction for a location on the screen, the amounts of correction being proportional to the fourth power of a distance from the center of the screen.

FIG. 8D is a schematic diagram showing the amount of horizontal modulation factor correction and the amount of vertical modulation factor correction for a location on the screen. FIG. 8D shows the amounts of correction proportional to the fourth power of a distance from the center of the screen.

Figure 8E:
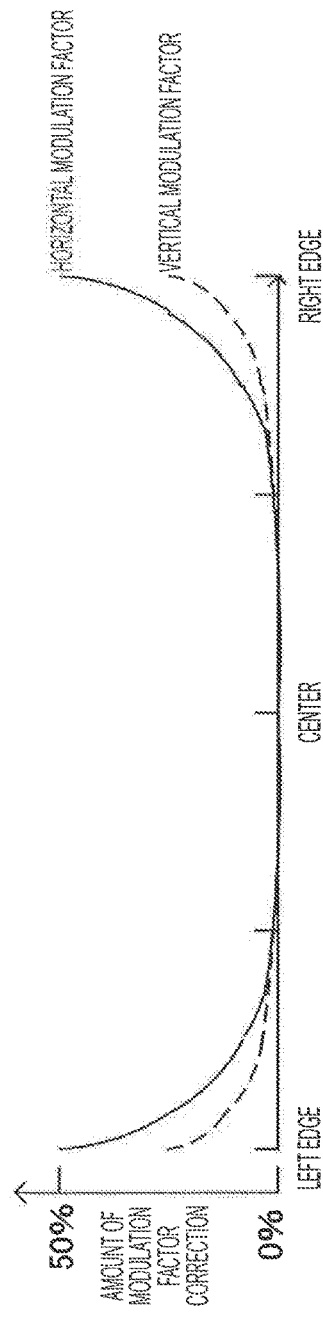
FIG. 8E is a schematic diagram showing an example of the amount of horizontal modulation factor correction and the amount of vertical modulation factor correction for a location on the screen, the amounts of correction being proportional to the sixth power of a distance from the center of the screen.

FIG. 8E is a schematic diagram showing the amount of horizontal modulation factor correction and the amount of vertical modulation factor correction for a location on the screen. FIG. 8E shows the amounts of correction proportional to the sixth power of a distance from the center of the screen.

Figure 8F:
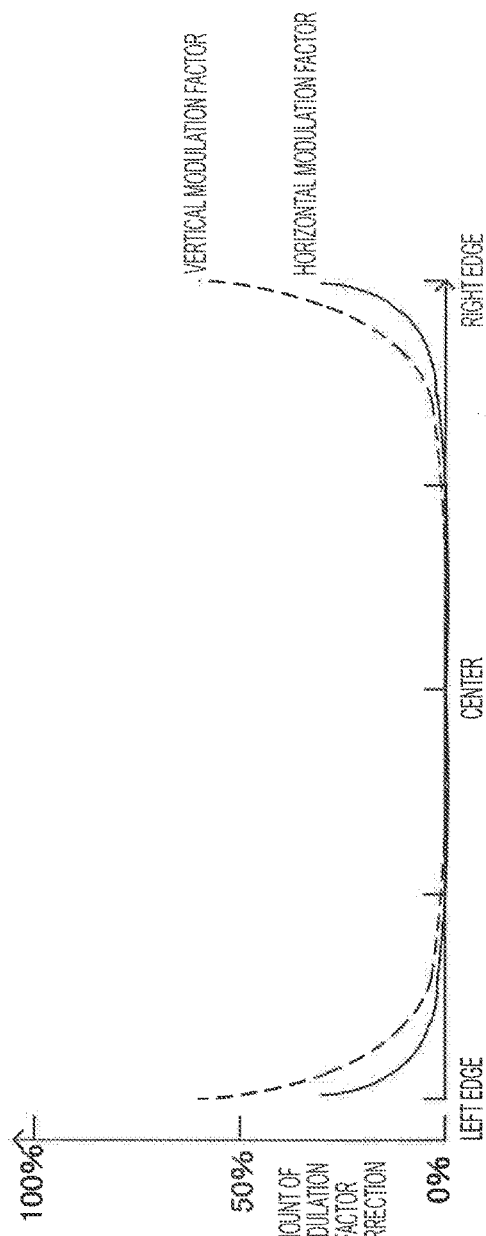
FIG. 8F is a schematic diagram showing an example of the amount of horizontal modulation factor correction and the amount of vertical modulation factor correction for a location on the screen, the amounts of correction being proportional to the eighth power of a distance from the center of the screen.

FIG. 8F is a schematic diagram showing the amount of horizontal modulation factor correction and the amount of vertical modulation factor correction for a location on the screen. FIG. 8F shows the amounts of correction proportional to the eighth power of a distance from the center of the screen.

Even if the modulation factors of the lenses are reduced as shown in FIGS. 6A to 6D, the amounts of horizontal contour (modulation factor) frequency (0d to 7d contours) correction and the amounts of vertical contour (modulation factor) frequency (OH to 7H contours) correction are individually calculated by combining together the proportion to the distance from the center of the screen (h–H/2), the proportion to the second power of the distance from the center of the screen, the proportion to the fourth power, the proportion to the sixth power, and the proportion to the eighth power as shown in FIGS. 8A to 8F. As a result, even if the circumferential direction modulation factor and the radial direction modulation factor of the lenses in which spherical aberration and coma aberration are sufficiently corrected but astigmatism is insufficiently corrected, are individually reduced as shown in FIGS. 7A to 7D which are schematic diagrams showing the correction of the modulation factors, the modulation factors can be individually corrected.

In the present invention, the numbers of subtractors, line memory units, and pixel delay units of FIGS. 1A to 1D which are detailed block diagrams of the contour correction circuits of one embodiment of the present invention are not limited to seven, and may be a larger natural number provided that the circuit size allows such placement.

When the numbers of adders, line memory units, and pixel delay units are not greater than or equal to seven, the numbers of adders, line memory units, and pixel delay units are preferably even numbers so as to achieve symmetrical contour correction.

That is, when horizontal contour (modulation factor) correction and vertical contour (modulation factor) correction are individually and simply performed, the number of reads from the frame memory is preferably four or six.

In a solid-state imaging apparatus of the present invention, even if an imaging device only outputs a video signal where the circumferential direction modulation factor and the radial direction modulation factor significantly differ from each other, due to astigmatism remaining in an apochromatic lens (affordable lens) which is named by Abbe and which is corrected for chromatic aberration at three wavelengths and corrected for spherical aberration and coma aberration at two wavelengths, a video signal having been subjected to contour correction with suppressed overshoot and undershoot can be outputted.

Second Embodiment

In a second embodiment, only differences from the first embodiment will be described.

In the second embodiment, description will be made using FIGS. 6A to 6D which are schematic diagrams showing changes in the modulation factors of lenses in which spherical aberration and coma aberration are sufficiently corrected but astigmatism is insufficiently corrected, and FIGS. 7A to 7D which are schematic diagrams showing the correction of the modulation factors of lenses in which spherical aberration and coma aberration are sufficiently corrected but astigmatism is insufficiently corrected. In the second embodiment, the amount of modulation factor correction is approximated by the second power, fourth power, sixth power, and eighth power of a distance from the center of the screen (h−H/2). The amount of modulation factor correction is approximated by the amount of reduction in correction center frequency. FIG. 7B is a schematic diagram showing the correction of a modulation factor of a telephoto end of a zoom lens for a case in which a Tamron 16-300 mm (trade name) lens is used at a telephoto end of a zoom lens. Correction of a vertical modulation factor can be approximated in proportion to a distance from the center of the screen. Correction of a horizontal modulation factor is not required. FIG. 7D is a schematic diagram showing the correction of the modulation factors of a Nikkor DX 35 mm F1.8 (trade name) which is a standard lens. Each of vertical modulation factor correction and horizontal modulation factor correction can be approximated in proportion to the second power of a distance from the center of the screen.

Third Embodiment

As another embodiment of astigmatism correction, an embodiment in which a frame memory is used is disclosed as a third embodiment. In the third embodiment, only differences from the first and second embodiments will be described.

In FIGS. 1A and 1B showing examples of the first and second embodiments, real-time processing of video signals is described using the line memory units M0 to M7 of FIG. 1A and the pixel delay units D0 to D7 of FIG. 1B. In the third embodiment, a frame memory unit M8 is used instead of the line memory units M0 to M7 and the pixel delay units D0 to D7. FIG. 1C shows a detail block diagram of a multi-scanning line (H) vertical contour correction circuit of the third embodiment. FIG. 1D shows a detailed block diagram of a multi-pixel horizontal contour correction circuit. As shown in FIGS. 1C and 1D, a contour correction signal is generated by the addition and subtraction of read signals from the frame memory unit M8.

If at least a double-data-rate SDRAM (abbreviated as DDR) which is used as the frame memory unit M8 and a field-programmable gate array (FPGA) which is configured as the signal processing unit 4 are high speed, serial operation by a single circuit is also possible for addition and subtraction.

That is, in the present invention, processing may be performed for video signals read from the frame memory unit M8 having stored therein video signals for digital zoom, conversion of the number of scanning lines, etc., as shown in FIGS. 1C and 1D.

In addition, a high-resolution imaging apparatus such as a television camera that has a nearly square aspect ratio such as 4:3 or 3:2 and that is at least HD such as 1K, 2K, 4K, or 8K may use a multi-pixel horizontal contour correction circuit, such as that shown in FIG. 1D, that generates a contour correction signal by the addition and subtraction of read signals from the frame memory unit M8. By this circuit, oblique upper right contour correction and oblique upper left contour correction or oblique upper right aperture (modulation factor) correction and oblique upper left aperture (modulation factor) correction are performed.

In this circuit, a pre-correction signal is inputted to the frame memory unit M8 from a lens (an apochromat named by Abbe) which is corrected for chromatic aberration at three wavelengths and corrected for spherical aberration and coma aberration at two wavelengths.

A CPU 6 includes a means for obtaining type information, focal length information, and aperture ratio information of the lens; and a means for obtaining and storing circumferential direction modulation factor information and radial direction modulation factor information for a focal length and an aperture ratio of the lens. The CPU 6 outputs information on a relationship between a location on the screen and contour correction control, in association with a circumferential direction modulation factor and a radial direction modulation factor which are related to astigmatism of the lens, based on the obtained lens type information, focal length information, and aperture ratio information and the stored circumferential direction modulation factor information and radial direction modulation factor information. The information may be a horizontal pixel number and the amounts of correction for contour correction for each frequency.

A location-on-the-screen control unit 5 including a horizontal pixel counter outputs a horizontal contour correction control signal, based on the information on a relationship between a location on the screen and contour correction control which is inputted from the CPU 6, a vertical synchronizing signal, a horizontal synchronizing signal, and a pixel clock. The location-on-the-screen control unit 5 including a horizontal pixel counter may include a circuit that individually calculates, for each oblique frequency, the amount of oblique upper right contour (modulation factor) correction and the amount of oblique upper left contour (modulation factor) correction for a location on the screen. In addition, the location-on-the-screen control unit 5 including a horizontal pixel counter may include a means for detecting timing for a location on the screen of a video signal, based on a horizontal synchronizing signal and a pixel clock.

The location-on-the-screen control unit 5 including a horizontal pixel counter may calculate, for example, the amount of correction proportional to a distance of a pixel corresponding to a video signal from the center of the screen (v−V/2 where V is the number of scanning lines and v is the horizontal pixel number, and h−H/2 where H is the number of horizontal pixels and h is the horizontal pixel number), the amount of correction proportional to the second power of the distance from the center of the screen, the amount of correction proportional to the fourth power of the distance from the center of the screen, the amount of correction proportional to the sixth power of the distance from the center of the screen, and the amount of correction proportional to the eighth power of the distance of the pixel from the center of the screen.

The location-on-the-screen control unit 5 including a horizontal pixel counter may individually calculate, for each oblique frequency, the amount of oblique upper right contour (modulation factor) correction and the amount of oblique upper left contour (modulation factor) correction for a location on the screen. A signal processing unit 4 to which a horizontal contour correction control signal is inputted includes a means for individually performing, for each oblique frequency, oblique upper right contour (modulation factor) correction and oblique upper left contour (modulation factor) correction, based on the generated information on a relationship between a location on the screen and contour (modulation factor) correction control and the detected timing for a location on the screen of a video signal. The signal processing unit 4 includes, as shown in FIG. 1D, a frame memory unit M8, subtractors (negative adders) N10 to N13 and N15 to N18, and an adder P14.

INDUSTRIAL APPLICABILITY

The invention is to allow an apochromatic lens to be used in a UHDTV with a landscape aspect ratio such as 16:9. The apochromatic lens is corrected for chromatic aberration at three wavelengths and corrected for spherical aberration and coma aberration at two wavelengths, and is represented by an affordable lens in which a circumferential direction modulation factor and a radial direction modulation factor differ from each other. To correct astigmatism remaining in the apochromatic lens, the amount of modulation factor correction proportional to the nth power (n is an integer greater than or equal to 0) of a distance from the center of a screen is calculated, the amount of horizontal contour (modulation factor) frequency (0d to 7d contours) correction and the amount of vertical contour (modulation factor) frequency (0H to 7H contours) correction are calculated by the location-on-the-screen control unit 5 including a horizontal pixel counter, and horizontal contour (modulation factor) and vertical contour (modulation factor) are made individually changeable at the left and right positions on the screen.

As a result, an imaging apparatus that corrects a modulation factor of an affordable lens in which a circumferential direction modulation factor and a radial direction modulation factor significantly differ from each other is implemented, enabling to put affordable UHDTVs into commercial production.

Figure 9:
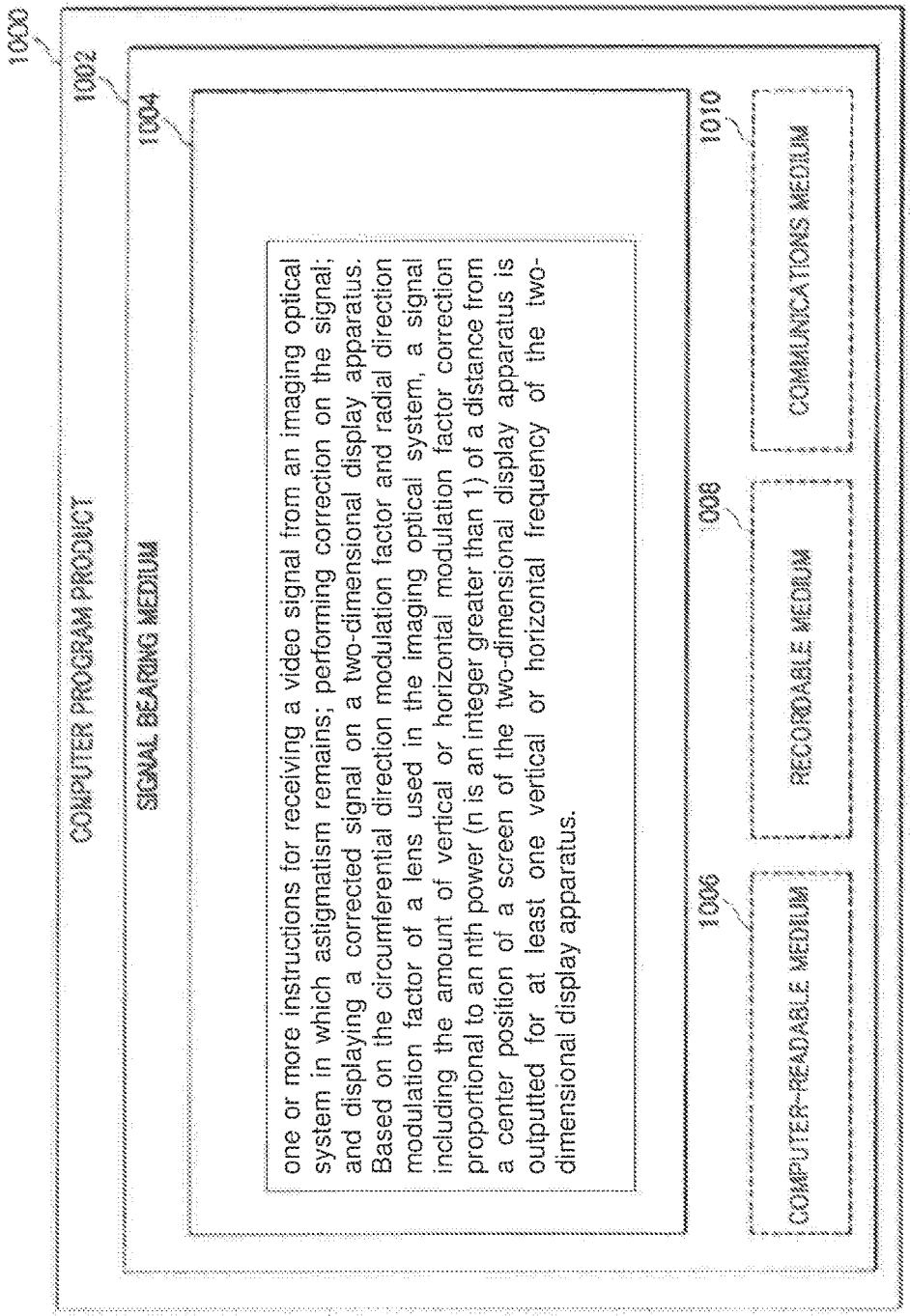
FIG. 9 illustrates computer program products that can be utilized to receive a video signal from an imaging optical system in which astigmatism remains, perform correction on the signal, and display a corrected signal on a two-dimensional display apparatus.

FIG. 9 illustrates computer program products 1000 that can be utilized for an image processing method in which a video signal is inputted from an imaging optical system in which astigmatism remains, performing correction on the signal, and displaying a corrected signal on a two-dimensional display apparatus, arranged in accordance with at least some embodiments described herein. Program product 1000 may include a signal bearing medium 1002. Signal bearing medium 1002 may include one or more instructions 1004 that, when executed by, for example, a processor, may provide the functionality described above with respect to FIGS. 1-8. By way of example, instructions 1004 may include: one or more instructions for receiving a video signal from an imaging optical system in which astigmatism remains; performing correction on the signal; and displaying a corrected signal on a two-dimensional display apparatus. Based on the circumferential direction modulation factor and radial direction modulation factor of a lens used in the imaging optical system, a signal including the amount of vertical or horizontal modulation factor correction proportional to an nth power (n is an integer greater than 1) of a distance from a center position of a screen of the two-dimensional display apparatus is outputted for at least one vertical or horizontal frequency of the two-dimensional display apparatus.

In some implementations, signal bearing medium. 1002 may encompass a computer-readable medium 1006, such as, but not limited to, a hard disk drive, a CD, a DVD, a digital tape, memory, etc. In some implementations, signal bearing medium 1002 may encompass a recordable medium 1008, such as, but not limited to, memory, read/write (RAY) CDs, R/W DVDs, etc. In some implementations, signal bearing medium 1002 may encompass a communications medium 1010, such as, but not limited to, a digital and/or an analog communication medium (e.g., a fiber optic cable, a waveguide, a wired communications link, a wireless communication link, etc.). Thus, for example, program product 1000 may be conveyed to one or more modules of safety component 200 by an RF signal bearing medium 1002, where the signal bearing medium 1002 is conveyed by a wireless communications medium 1010 (e.g., a wireless communications medium conforming with the IEEE 802.11 standard).

Figure 10:
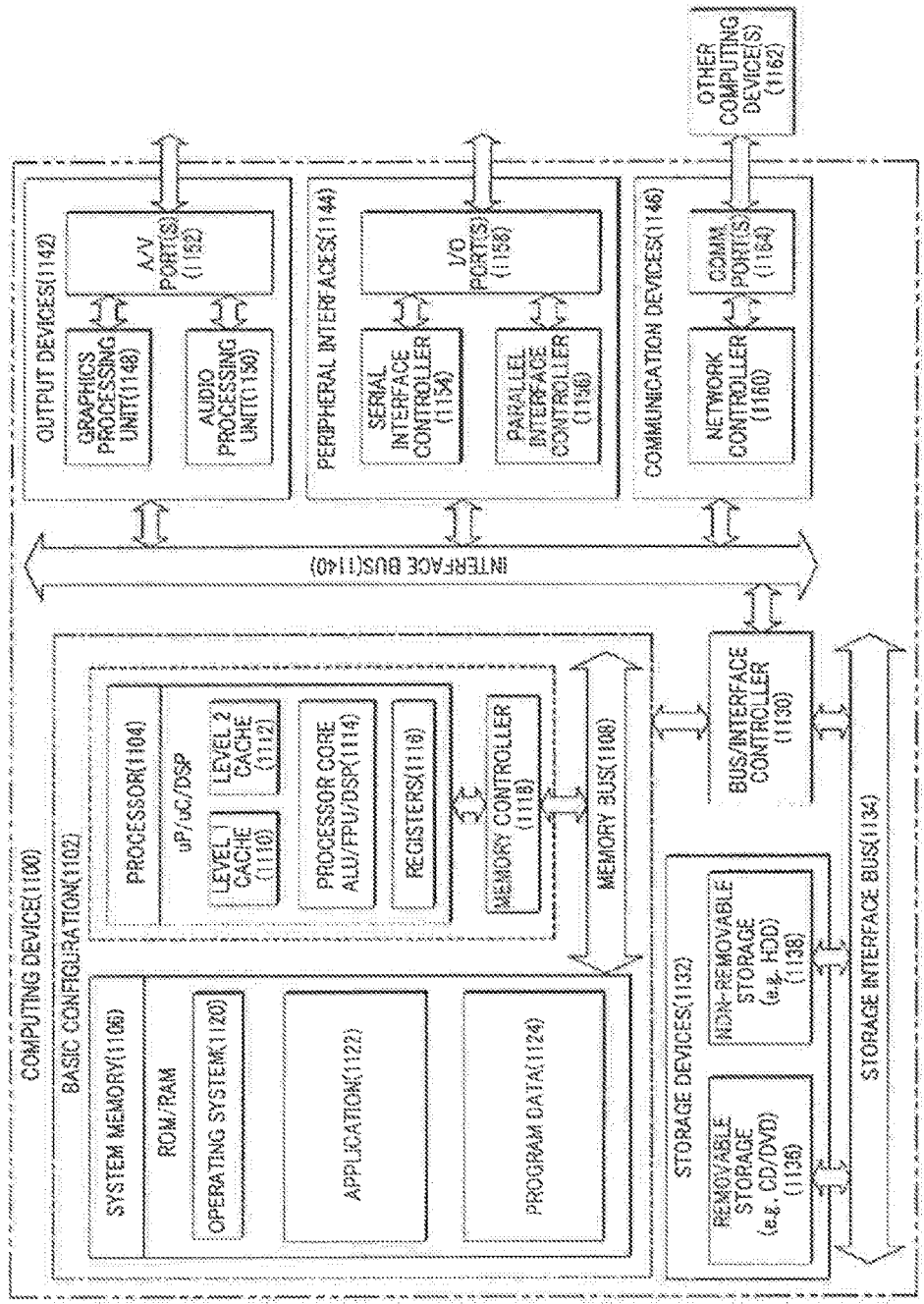
FIG. 10 is a block diagram illustrating an example computing device that can be utilized to receive a video signal from an imaging optical system in which astigmatism remains, perform correction on the signal, and display a corrected signal on a two-dimensional display apparatus.

FIG. 10 is a block diagram illustrating an example computing device 1100 that can be utilized to provide receiving a video signal from an imaging optical system in which astigmatism remains, performing correction process, and displaying a corrected signal on a two-dimensional display apparatus, arranged in accordance with, or in the alternative of, at least some embodiments described herein including, for example, lens 1, imaging unit 2, imaging apparatus 3, a signal processing unit 4, location-on-the-screen control unit 5, and CPU 6. In a very basic configuration 1102, computing device 1100 typically includes one or more processors 1104 and a system memory 1106. A memory bus 1108 may be used for communicating between processor 1104 and system memory 1106.

Depending on the desired configuration, processor 1104 may be of any type including but not limited to a microprocessor (g), a microcontroller (μC), a digital signal processor (DSP), or any combination thereof. Processor 1104 may include one more levels of caching, such as a level one cache 1110 and a level two cache 1112, a processor core 1114, and registers 1116. An example processor core 1114 may include an arithmetic logic unit (ALU), a floating point unit (FPU), a digital signal processing core (DSP Core), or any combination thereof. An example memory controller 1118 may also be used with processor 1104, or in some implementations memory controller 1118 may be an internal part of processor 1104.

Depending on the desired configuration, system memory 1106 may be of any type including but not limited to volatile memory (such as RAM), non-volatile memory (such as ROM, flash memory, etc.) or any combination thereof. System memory 1106 may include an operating system 1120, one or more applications 1122, and program data 1124.

Computing device 1100 may have additional features or functionality, and additional interfaces to facilitate communications between basic configuration 1102 and any required devices and interfaces. For example, a bus/interface controller 1130 may be used to facilitate communications between basic configuration 1102 and one or more data storage devices 1132 via a storage interface bus 1134. Data storage devices 1132 may be removable storage devices 1136, non-removable storage devices 1138, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1106, removable storage devices 1136 and non-removable storage devices 1138 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1100. Any such computer storage media may be part of computing device 1100.

Computing device 1100 may also include an interface bus 1140 for facilitating communication from various interface devices (e.g., output devices 1142, peripheral interfaces 1144, and communication devices 1146) to basic configuration 1102 via bus/interface controller 1130. Example output devices 1142 include a graphics processing unit 1148 and an audio processing unit 1150, which may be configured to communicate to various external devices such as a display or speakers via one or more A/V ports 1152. Example peripheral interfaces 1144 include a serial interface controller 1154 or a parallel interface controller 1156, which may be configured to communicate with external devices such as input devices (e.g., keyboard, mouse, pen, voice input device, touch input device, etc.) or other peripheral devices (e.g., printer, scanner, etc.) via one or more I/O ports 1158. An example communication device 1146 includes a network controller 1160, which may be arranged to facilitate communications with one or more other computing devices 1162 over a network communication link via one or more communication ports 1164.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. Byway of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1100 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1100 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term. "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

REFERENCE SIGNS LIST

1: lens, 2 and 7: imaging unit, 3 and 7: imaging apparatus, 4: signal processing unit with a function of being able to individually change a center frequency for vertical contour correction and a center frequency for horizontal contour correction, 5: location-on-the-screen control unit including a horizontal pixel counter, 6: CPU, 8: signal processing unit with a function of being able to change contour enhancement, 20 to 27 and 40 to 47: adder, 28 and 48: video level determiner, 31 and 51: small amplitude/large amplitude compressor, 29, 49, 32, and 52: multiplier, M0 to M7: line memory unit, M8: frame memory unit, D0 to D7: pixel delay unit, and N0 to N3, N5 to N8, N10 to N13, and N15 to N18: negative multiplier, P1, P4, P11 and P14: positive multiplier.

The invention claimed is:

1. An image processing method to display on a location of a screen for a wide-aspect ratio imaging apparatus that uses a lens, comprising:

performing at least one of:
horizontal contour correction and vertical contour correction for multi-frequency enhancement, or
horizontal aperture modulation factor correction and vertical aperture modulation factor correction for multi-frequency enhancement;
   obtaining type information, focal length information, and aperture ratio information of a lens;
   obtaining and storing circumferential direction modulation factor information and radial direction modulation factor information of the lens;
   individually calculating, for each frequency:
a first amount of vertical contour modulation factor correction and a first amount of horizontal contour modulation factor correction which are proportional to a distance of a pixel from a center of a screen,
a second amount of vertical contour modulation factor correction and a second amount of horizontal contour modulation factor correction which are proportional to a second power of the distance of the pixel from the center of the screen,
a third amount of vertical contour modulation factor correction and a third amount of horizontal contour modulation factor correction which are proportional to a fourth power of the distance of the pixel from the center of the screen,
a fourth amount of vertical contour modulation factor correction and a fourth amount of horizontal contour modulation factor correction which are proportional to a sixth power of the distance of the pixel from the center of the screen, and
a fifth amount of vertical contour modulation factor correction and a fifth amount of horizontal contour modulation factor correction which are proportional to an eighth power of the distance of the pixel from the center of the screen; and
displaying a location on the screen based on:
the type information, the focal length information, and the aperture ratio information of the lens,
the circumferential direction modulation factor information and the radial direction modulation factor information of the lens, and
the individually performed vertical contour modulation factor correction and horizontal contour modulation factor correction.

* * * * *